US009862848B2

(12) United States Patent
Imai et al.

(10) Patent No.: US 9,862,848 B2
(45) Date of Patent: *Jan. 9, 2018

(54) INK SET

(71) Applicant: Brother Kogyo Kabushiki Kaisha, Nagoya-shi, Aichi-ken (JP)

(72) Inventors: Kenjiro Imai, Toyohashi (JP); Hideji Fukaya, Nisshin (JP); Ayako Ohishi, Nagoya (JP); Mitsunori Maeda, Nagoya (JP); Akiko Kodama, Nagakute (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 203 days.

This patent is subject to a terminal disclaimer.

(21) Appl. No.: 14/673,291

(22) Filed: Mar. 30, 2015

(65) Prior Publication Data

US 2015/0275004 A1  Oct. 1, 2015

(30) Foreign Application Priority Data

Mar. 31, 2014 (JP) .................................. 2014-072043
Mar. 31, 2014 (JP) .................................. 2014-072046

(51) Int. Cl.
*C09D 11/322* (2014.01)
*C09D 11/102* (2014.01)
*C09D 11/38* (2014.01)
*C09D 11/54* (2014.01)

(52) U.S. Cl.
CPC .......... *C09D 11/322* (2013.01); *C09D 11/102* (2013.01); *C09D 11/38* (2013.01); *C09D 11/54* (2013.01)

(58) Field of Classification Search
CPC ..... C09D 11/322; C09D 11/102; C09D 11/38; C09D 11/54
See application file for complete search history.

(56) References Cited

U.S. PATENT DOCUMENTS

| 5,609,671 | A  | 3/1997  | Nagasawa     |
| 5,837,045 | A  | 11/1998 | Johnson et al. |
| 7,922,805 | B2 | 4/2011  | Kowalski et al. |
| 8,016,404 | B2 | 9/2011  | Kato et al.  |
| 8,858,695 | B2 | 10/2014 | Gu et al.    |
| 8,916,625 | B2 | 12/2014 | Denda et al. |

(Continued)

FOREIGN PATENT DOCUMENTS

| JP | H08-3498 A    | 1/1996  |
| JP | 2000-513396 A | 10/2000 |

(Continued)

OTHER PUBLICATIONS

Zhang et al. Synthesis of core-shell acrylic-polyurethane hybrid latex as binder of aqueous pigment inks for digital printing. Progress in Natural Science: Materials International 2012;22(1):71-78. Feb. 16, 2012.*

(Continued)

*Primary Examiner* — John Uselding
(74) *Attorney, Agent, or Firm* — Banner & Witcoff, Ltd.

(57) ABSTRACT

An ink set includes a treatment agent containing fumed silica and a bright pigment ink containing a bright pigment and water. The treatment agent or the bright pigment ink contains urethane resin.

20 Claims, 2 Drawing Sheets

(56) References Cited

U.S. PATENT DOCUMENTS

| | | | |
|---|---|---|---|
| 9,283,746 B2* | 3/2016 | Imai | B41J 2/01 |
| 9,340,690 B2* | 5/2016 | Maeda | C09D 11/322 |
| 9,393,808 B2* | 7/2016 | Ohishi | B41J 2/01 |
| 2006/0201380 A1 | 9/2006 | Kowalski et al. | |
| 2007/0100023 A1 | 5/2007 | Burns et al. | |
| 2007/0100024 A1 | 5/2007 | Gu et al. | |
| 2008/0118657 A1* | 5/2008 | Taverizatshy | C09D 11/38 427/466 |
| 2008/0241398 A1 | 10/2008 | Kato et al. | |
| 2009/0053415 A1 | 2/2009 | Isobe | |
| 2010/0190922 A1 | 7/2010 | Shinozaki et al. | |
| 2010/0227181 A1 | 9/2010 | Kitamura | |
| 2010/0261813 A1 | 10/2010 | Bobsein et al. | |
| 2011/0205288 A1 | 8/2011 | Matsuyama et al. | |
| 2012/0019587 A1* | 1/2012 | Koenig | B41M 5/52 347/20 |
| 2012/0038702 A1 | 2/2012 | Kagata et al. | |
| 2013/0057616 A1 | 3/2013 | Hirata et al. | |
| 2013/0108841 A1 | 5/2013 | Denda et al. | |

FOREIGN PATENT DOCUMENTS

| | | | |
|---|---|---|---|
| JP | 2003160763 A | 6/2003 | |
| JP | 2007-023161 A | 2/2007 | |
| JP | 2008-524400 A | 7/2008 | |
| JP | 2008-194970 A | 8/2008 | |
| JP | 2008-246821 A | 10/2008 | |
| JP | 2009-515007 A | 4/2009 | |
| JP | 2010-174100 A | 8/2010 | |
| JP | 2010-280830 A | 12/2010 | |
| JP | 2012-035590 A | 2/2012 | |
| JP | 2012-035591 A | 2/2012 | |
| JP | 2012-101491 A | 5/2012 | |
| JP | 2012-166455 A | 9/2012 | |
| JP | 2012-196893 A | 10/2012 | |
| JP | 2013-043951 A | 3/2013 | |
| JP | 2013-052654 A | 3/2013 | |
| JP | 2013-071277 A | 4/2013 | |
| JP | 2013-091761 A | 5/2013 | |
| JP | 2013-095081 A | 5/2013 | |
| WO | 9748769 A1 | 12/1997 | |
| WO | 2006-066132 A2 | 6/2006 | |
| WO | 2006/112031 A1 | 11/2008 | |

OTHER PUBLICATIONS

Cabot Cab-O-Sperse Dispersions for Ink Jet Media and Paper Coatings. Sep. 2013.*
Mar. 30, 2015—Co-pending U.S. Appl. No. 14/673,299.
Mar. 30, 2015—Co-pending U.S. Appl. No. 14/673,189.
Mar. 30, 2015—Co-pending U.S. Appl. No. 14/673,394.
Jun. 22, 2015—U.S. Non-Final Office Action—U.S. Appl. No. 14/673,299.
Jun. 22, 2015—U.S. Non-Final Office Action—U.S. Appl. No. 14/673,394.
Oct. 2, 2015—U.S. Non-Final Office Action—U.S. Appl. No. 14/673,189.
Oct. 1, 2015—U.S. Notice of Allowance—U.S. Appl. No. 14/673,299.
Nov. 12, 2015—U.S. Notice of Allowance—U.S. Appl. No. 14/673,394.
Mar. 2, 2016—U.S. Notice of Allowance—U.S. Appl. No. 14/673,189.
Oct. 10, 2017—(JP) Notice of Reasons for Rejection—App 2014-072044—Partial Eng. Tran.
Oct. 10, 2017—(JP) Notice of Reasons for Rejection—App 2014-072047—Partial Eng. Tran.
Oct. 19, 2017—(JP) Notice of Reasons for Rejection—App 2014-072045—Partial Eng. Tran.
Oct. 30, 2017—(JP) Notice of Reasons for Rejection—App 2014-072046—partial Eng Tran.
Oct. 31, 2017—(JP) Notice of Reasons for Rejection—App 2014-072043—partial Eng Tran.

* cited by examiner

INK SET

CROSS REFERENCE TO RELATED APPLICATION

The present application claims priorities from Japanese Patent Applications No. 2014-072043 filed on Mar. 31, 2014 and No. 2014-072046 filed on Mar. 31, 2014, the disclosures of which are incorporated herein by reference in their entireties.

BACKGROUND OF THE INVENTION

Field of the Invention:
The present invention relates to an ink set.
Description of the Related Art:
There is a growing need for recorded matters having bright images (metallic luster feeling) formed thereon in recent years. As a method for obtaining the bright recorded matter, there is known a method for discharging a bright pigment ink onto a recording medium having good surface smoothness (high smoothness) such as glossy paper in accordance with the ink-jet system. This method, however, has difficulty in obtaining satisfactory brightness when a recording medium with poor surface smoothness (low smoothness) such as plain paper is used. This is because the bright pigment is not disposed smoothly on the recording medium with poor surface smoothness, which causes the diffuse reflection of light.

In order to obtain the brightness when the recording medium with poor surface smoothness such as plain paper is used, the following ink-jet recording method (Japanese Patent Application laid-open No. 2012-35591 corresponding to United States Patent Application Publication No. 2012/0038702) has been suggested. That is, resin ink, which is obtained by dispersing or dissolving resin components in a solvent in advance, is applied on an area, of the recording medium, where the bright pigment ink is to be discharged, to smooth the unevenness on the surface of the recording medium, and thereby forming a base layer having good surface smoothness.

The method for forming the base layer with the resin ink, however, has the following possibility. That is, the resin components of the resin ink prevent the solvent of the bright pigment ink from permeating the recording medium, which makes it impossible to dispose the bright pigment on the surface of the recording medium smoothly. As a result, a blur and unevenness of the bright pigment ink occur to lose brightness.

SUMMARY OF THE INVENTION

In view of the above, an object of the present teaching is to provide an ink set which is capable of obtaining a recorded matter in which a blur and unevenness are inhibited and brightness is good, even when a recording medium having poor surface smoothness is used.

According to an aspect of the present teaching, there is provided an ink set including: a treatment agent containing fumed silica; and a bright pigment ink containing a bright pigment and water, wherein the treatment agent or the bright pigment ink contains urethane resin.

DESCRIPTION OF THE PREFERRED EMBODIMENTS

Figure 1:
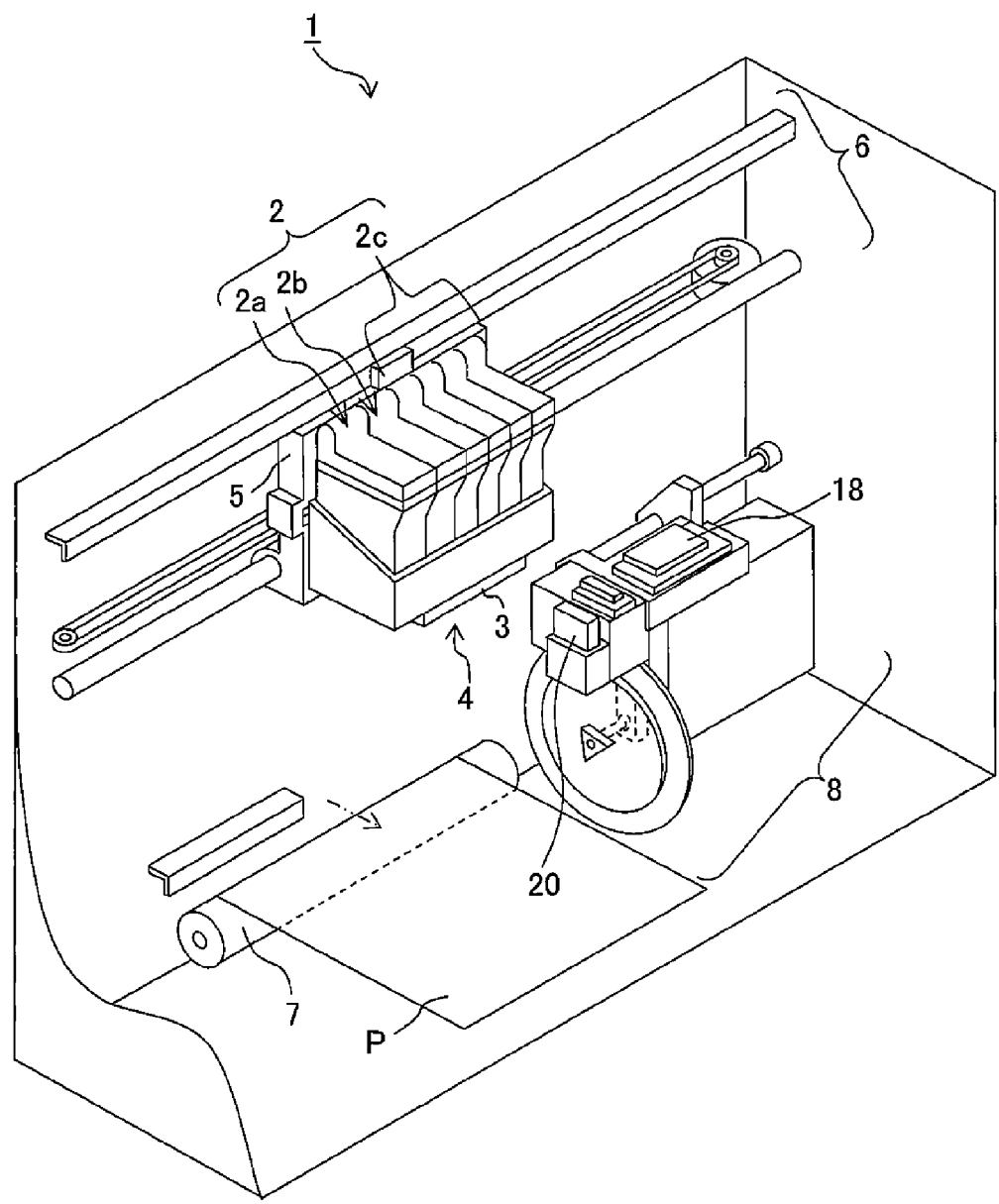
FIG. 1 is a schematic perspective view of an exemplary construction of an ink-jet recording apparatus of the present teaching.

An ink set and a recording method of the present teaching may be used in a recording medium having good surface smoothness such as glossy paper. The ink set and the recording method of the present teaching may be used in a recording medium having poor surface smoothness such as plain paper and matte paper. The ink set and the recording method of the present teaching are capable of obtaining a recorded matter in which a blur and unevenness are inhibited and brightness is good, even when the recording medium having poor surface smoothness such as plain paper and matte paper is used.

An explanation will be made about the ink set of the present teaching. The ink set of the present teaching includes a treatment agent and a bright pigment ink.

The treatment agent will be explained first. The treatment agent contains fumed silica. Unlike colloidal silica produced by a wet method, the fumed silica is produced by a dry method (gas phase method). The reason why the ink set of the present teaching is less likely to cause unevenness is assumed that the solvent in the bright pigment ink is more likely to be absorbed into the recording medium via the fumed silica. The mechanisms for improving brightness and preventing the blur and unevenness by the aid of the fumed silica are not clear, but are assumed as follows. In general, particles of the colloidal silica have substantially spherical shapes during the process of manufacturing the colloidal silica by the wet method. On the other hand, particles of the fumed silica produced by the dry method (gas phase method) are more likely to form chainlike secondary aggregates, and the specific surface areas of particles of the fumed silica are larger than those of particles of the colloidal silica. This allows the fumed silica to catch the bright pigment more easily so that the bright pigment is remained on the surface of the recording medium more stably as compared with the colloidal silica. Accordingly, the solvent in the bright pigment ink is more likely to be absorbed into the recording medium via the fumed silica and the bright pigment is more likely to be remained on the surface of the recording medium, and thus good brightness would be obtained and the blur would be inhibited. The above mechanisms, however, are just assumptions and the present teaching is not limited and restricted by the assumptions.

The fumed silica preferably has an average particle size of 250 nm or less, and more preferably has an average particle size of 150 nm or less. By making the average particle size of the fumed silica 250 nm or less, it is possible to obtain a recorded matter in which the unevenness and blur are inhibited further and the brightness is better. By making the average particle size of the fumed silica 150 nm or less, it is possible to obtain a recorded matter in which the unevenness and blur are inhibited still further and the brightness is much better. From the viewpoint of permeability into the recording medium, the fumed silica preferably has an average particle size of 50 nm or more. The average particle size of the fumed silica can be measured as the arithmetic mean diameter, for example, by using a dynamic light scattering particle size analyzer "LB-550" manufactured by HORIBA, Ltd.

It is preferred that the fumed silica be dispersible in water without using any dispersant, owing to the fact that at least one of anionic hydrophilic functional group and the salt thereof or at least one of cationic hydrophilic functional group and the salt thereof is introduced into the particle surfaces by the chemical bond directly or with any group intervening therebetween. That is, it is preferred that the fumed silica be self-dispersible fumed silica. Using the self-dispersible fumed silica can solve the problem of the viscosity increase of the treatment agent which would be otherwise caused by a polymeric pigment dispersant.

As will be described below, the treatment agent of the ink set of the present teaching may contain a colorant. In a case that the treatment agent contains the colorant, it is preferred that the fumed silica contained in the treatment agent be anionic fumed silica of which particle surfaces are modified by the anionic hydrophilic functional group. The colorant is typically dispersed or dissolved in the treatment agent in a state of being negatively charged. It is assumed that the anionic fumed silica can be dispersed in the treatment agent more stably due to the electrostatic repulsion against the negatively charged colorant. From the viewpoint of improving the image quality of the recorded matter such as the improvement of the brightness and the inhibition of the unevenness and blur, it is preferred that the fumed silica contained in the treatment agent be cationic fumed silica of which particle surfaces are modified by the cationic hydrophilic functional group. In a case that recording is performed on a recording medium by using the ink set of the present teaching, the fumed silica in the treatment agent comes into contact with the bright pigment in the bright pigment ink on the recording medium. The bright pigment is typically negatively charged. Since the negatively charged bright pigment attracts the cationic fumed silica due to electrostatic attractive force, the fumed silica easily catches the bright pigment to allow the bright pigment to stay on the surface of the recoding medium. This may further improve the brightness of the recorded matter. The above mechanism, however, is just an assumption and the present teaching is not limited and restricted by the assumption.

The fumed silica may be prepared privately or independently, or any commercially available product may be used for the fumed silica. The commercially available product is exemplified, for example, by "CAB-O-SPERSE (trade name) PG 001" (anionic), "CAB-O-SPERSE (trade name) PG 002" (anionic), and "CAB-O-SPERSE (trade name) PG 022" (cationic) produced by Cabot Corporation.

The blending amount of the fumed silica in the entire amount of the treatment agent is, for example, in a range of 1% by weight to 40% by weight, preferably in a range of 4% by weight to 30% by weight, and more preferably in a range of 8% by weight to 25% by weight. By making the fumed silica ratio 8% by weight or more, a recorded matter having better fixation can be obtained.

It is preferred that the treatment agent further contain urethane resin. In the ink set of the present teaching, in addition to or rather than the treatment agent, the bright pigment ink which will be described later may contain the urethane resin. That is, in the ink set of the present teaching, the urethane resin may be contained only in the treatment agent, may be contained only in the bright pigment ink, or may be contained both in the treatment agent and the bright pigment ink. For example, in a case that the treatment agent and the bright pigment ink of the ink set of the present teaching are applied onto a recording medium in this order and that the brightness of the recorded matter is treated as important, it is preferred that the treatment agent contain the urethane resin. Meanwhile, in the case that the treatment agent and the bright pigment ink of the ink set of the present teaching are applied onto a recording medium in this order and that the drying property of the treatment agent is treated as important, it is preferred that the bright pigment ink contain the urethane resin.

The urethane resin is not particularly limited, and any urethane resin may be used. It is preferred that the urethane resin be urethane emulsion. The "urethane emulsion" is a system in which urethane resin particles are dispersed in water (hydrophilic solvent may be contained). A method for converting the urethane resin into the urethane emulsion is exemplified, for example, by a method for introducing hydrophilic functional group such as carboxylate group or sulfonate group into the urethane resin to cause self-emulsification and a method for forcibly emulsifying the urethane resin by use of a surfactant. Examples of the surfactant include nonionic surfactants, anionic surfactants, cationic surfactants, and ampholytic surfactants. The urethane resin particles contained in the urethane emulsion preferably have an average particle size of 300 nm or less, and more preferably has an average particle size of 150 nm or less. By making the average particle size of the urethane resin particles contained in the urethane emulsion 300 nm or less, it is possible to obtain a recorded matter in which the unevenness and blur are inhibited further and the brightness and fixation are better. By making the average particle size of the urethane resin particles contained in the urethane emulsion 150 nm or less, it is possible to obtain a recorded matter in which the unevenness and blur are inhibited still further and the brightness and fixation are much better. The urethane resin particles contained in the urethane emulsion preferably have an average particle size of 1 nm or more, and more preferably has an average particle size of 5 nm or more. The average particle size of the urethane resin particles contained in the urethane emulsion can be measured in the similar manner as the average particle size of the fumed silica.

It is preferred that the average particle size of the urethane resin particles contained in the urethane emulsion be smaller than the average particle size of the fumed silica. In this case, the urethane resin particles contained in the urethane resin particles can fill the spaces or voids between particles of the fumed silica on the recording medium, so that the recording medium can have better surface smoothness. Accordingly, a recorded matter having better brightness can be obtained.

The urethane resin may be prepared privately or independently, or any commercially available product may be used for the urethane resin. The commercially available product is exemplified, for example, by "UCOAT (trade name) UWS-145" (average particle size: 20 nm), "PERMARIN (trade name) UA-150" (average particle size: 70 nm), and "PERMARIN (trade name) UA-368" (average particle size: 300 nm) produced by Sanyo Chemical Industries, Ltd., and "SUPERFLEX (trade name) series" produced by DAI-ICHI KOGYO SEIYAKU CO., LTD.

The blending amount of the urethane resin in the entire amount of at least one of the treatment agent and the bright pigment ink is, for example, in a range of 0.5% by weight to 45% by weight, preferably in a range of 1% by weight to 20% by weight, and more preferably in a range of 2% by weight to 8% by weight. The phrase "the blending amount of the urethane resin in the entire amount of at least one of the treatment agent and the bright pigment ink" is the sum (T+I) of the blending amount of the urethane resin in the treatment agent (T: % by weight) and the blending amount of the urethane resin in the bright pigment ink (I: % by weight). In a case that the urethane resin is contained only in the treatment agent, I is zero. Thus, the sum (T+I) is the blending amount (T) of the urethane resin in the entire amount of the treatment agent. In a case that the urethane resin is contained only in the bright pigment ink, T is zero. Thus, the sum (T+I) is the blending amount (I) of the urethane resin in the entire amount of the bright pigment ink.

In the ink set of the present teaching, it is preferred that the treatment agent contain the fumed silica and that at least one of the treatment agent and the bright pigment ink contain the urethane resin to satisfy the following conditions (A) and (B). It is further preferred that the treatment agent contain the fumed silica and that at least one of the treatment agent and the bright pigment ink contain the urethane resin to satisfy the following conditions to satisfy the following conditions (A1) and (B1).

$2 \leq X/Y \leq 5$ (A)

$5 \leq X+Y \leq 40$ (B)

$2.5 \leq X/Y \leq 4$ (A1)

$10 \leq X+Y \leq 30$ (B1)

X: a blending amount (% by weight) of the fumed silica in the treatment agent

Y: the sum of a blending amount (% by weight) of the urethane resin in the treatment agent and a blending amount (% by weight) of the urethane resin in the bright pigment ink A recorded matter in which the unevenness and blur are inhibited further can be obtained by satisfying $2 \leq X/Y$, and a recorded matter in which the unevenness and blur are inhibited still further can be obtained by satisfying $2.5 \leq X/Y$. A recorded matter with better brightness can be obtained by satisfying $5 \leq X+Y$, and a recorded matter with much better brightness can be obtained by satisfying $10 \leq X+Y$. A recorded matter in which the unevenness and blur are inhibited further and the fixation is better can be obtained by satisfying $X/Y \leq 5$ and $X+Y \leq 40$, and a recorded matter in which the unevenness and blur are inhibited still further and the fixation is much better can be obtained by satisfying $X/Y \leq 4$ and $X+Y \leq 30$.

As described above, the treatment agent may further contain a colorant. In a case that the treatment agent contains the colorant, all of the colors (chromatic colors and achromatic colors including black and grey) can have satisfactory brightness. The colorant may be any of a pigment and a dye. Further, the mixture of the pigment and the dye may be used as the colorant.

The pigment is exemplified, for example, by carbon black, inorganic pigments, and organic pigments. The carbon black is exemplified, for example, by furnace black, lamp black, acetylene black, and channel black. The inorganic pigments are exemplified, for example, by titanium oxide, inorganic pigments based on iron oxide, and inorganic pigments based on carbon black. The organic pigments are exemplified, for example, by azo-pigments such as azo lake, insoluble azo-pigment, condensed azo-pigment, and chelate azo-pigment; polycyclic pigments such as phthalocyanine pigment, perylene and perynon pigments, anthraquinone pigment, quinacridone pigment, dioxadine pigment, thioindigo pigment, isoindolinone pigment, and quinophthalone pigment; dye lake pigments such as basic dye type lake pigment and acid dye type lake pigment; nitro pigments; nitroso pigments; and aniline black daylight fluorescent pigment. Any other pigment is also usable provided that the pigment is dispersible in a water phase (aqueous phase). Specific examples of the pigments as described above include, for example, Color Index (hereinafter referred to as C.I.) Pigment Black 1, 6, and 7; C.I. Pigment Yellow 1, 2, 3, 12, 13, 14, 15, 16, 17, 55, 78, 150, 151, 154, 180, 185, and 194; C.I. Pigment Orange 31 and 43; C.I. Pigment Red 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C.I. Pigment Violet 196; C.I. Pigment Blue 1, 2, 3, 15, 15:1, 15:2, 15:3, 15:4, 16, 22, and 60; and C.I. Pigment Green 7 and 36.

The pigment may be a self-dispersible pigment. The self-dispersible pigment is dispersible in water without using any dispersing agent, for example, owing to the fact that at least one of the hydrophilic functional group and the salt thereof including, for example, carbonyl group, hydroxyl group, carboxylic acid group, sulfonic acid group (sulfonate group), phosphoric acid group (phosphate group), etc. is introduced into the pigment particles by the chemical bond directly or with any group intervening therebetween. It is possible to use self-dispersible pigments subjected to the treatment by any one of methods described, for example, in Japanese Patent Application Laid-open No. 8-3498 corresponding to U.S. Pat. No. 5,609,671, Published Japanese Translation of PCT International Publication for Patent Application No. 2000-513396 corresponding to U.S. Pat. No. 5,837,045, Published Japanese Translation of PCT International Publication for Patent Application No. 2008-524400 corresponding to United States Patent Application Publication No. US2006/0201380, and Published Japanese Translation of PCT International Publication for Patent Application No. 2009-515007 corresponding to United States Patent Application Publication No. US2007/0100023 and United States Patent Application Publication No. US2007/0100024. Either one of the inorganic pigment and the organic pigment may be used as a material for the self-dispersible pigment. The pigment which is suitable for the above-described treatment is exemplified, for example, by carbon black such as "MA8" and "MA100" produced by Mitsubishi Chemical Corporation and "Color Black FW200" produced by Degussa. Any commercially available product may be used for the self-dispersible pigment. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by Cabot Corporation; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink SC Holdings Co., Ltd.

The solid content blending amount of the pigment (pigment solid content) in the entire amount of the treatment agent is not particularly limited, and the blending amount is, for example, in a range of 0.5% by weight to 20% by weight, preferably in a range of 3% by weight to 10% by weight, and more preferably in a range of 3% by weight to 7% by weight.

The dye is not particularly limited, which is exemplified, for example, by direct dyes, acid dyes, basic dyes, and reactive dyes. Specified examples of the dye include, for example, C.I. Direct Black, C.I. Direct Blue, C.I. Direct Red, C.I. Direct Yellow, C.I. Direct Orange, C.I. Direct Violet, C.I. Direct Brown, C.I. Direct Green, C.I. Acid Black, C.I. Acid Blue, C.I. Acid Red, C.I. Acid Yellow, C.I. Acid Orange, C.I. Acid Violet, C.I. Basic Black, C.I. Basic Blue, C.I. Basic Red, C.I. Basic Violet, and C.I. Food Black. C.I. Direct Black is exemplified, for example, by C.I. Direct Black 17, 19, 32, 51, 71, 108, 146, 154, and 168. C.I. Direct Blue is exemplified, for example, by C.I. Direct Blue 6, 22, 25, 71, 86, 90, 106, and 199. C.I. Direct Red is exemplified, for example, by C.I. Direct Red 1, 4, 17, 28, 83, and 227. C.I. Direct Yellow is exemplified, for example, by C.I. Direct Yellow 12, 24, 26, 86, 98, 132, 142, and 173. C.I. Direct Orange is exemplified, for example, by C.I. Direct Orange 34, 39, 44, 46, and 60. C.I. Direct Violet is exemplified, for example, by C.I. Direct Violet 47 and 48. C.I. Direct Brown is exemplified, for example, by C.I. Direct Brown 109. C.I. Direct Green is exemplified, for example, by C.I. Direct Green 59. C.I. Acid Black is exemplified, for example, by C.I. Acid Black 2, 7, 24, 26, 31, 52, 63, 112, and 118. C.I. Acid Blue is exemplified, for example, by C.I. Acid Blue 9, 22, 40, 59, 93, 102, 104, 117, 120, 167, 229, and 234. C.I. Acid Red is exemplified, for example, by C.I. Acid Red 1, 6, 32, 37, 51, 52, 80, 85, 87, 92, 94, 115, 180, 256, 289, 315, and 317. C.I. Acid Yellow is exemplified, for example, by C.I. Acid Yellow 11, 17, 23, 25, 29, 42, 61, and 71. C.I. Acid Orange is exemplified, for example, by C.I. Acid Orange 7 and 19. C.I. Acid Violet is exemplified, for example, by C.I. Acid Violet 49. C.I. Basic Black is exemplified, for example, by C.I. Basic Black 2. C.I. Basic Blue is exemplified, for example, by C.I. Basic Blue 1, 3, 5, 7, 9, 24, 25, 26, 28, and 29. C.I. Basic Red is exemplified, for example, by C.I. Basic Red 1, 2, 9, 12, 13, 14, and 37. C.I. Basic Violet is exemplified, for example, by C.I. Basic Violet 7, 14, and 27. C.I. Food Black is exemplified, for example, by C.I. Food Black 1 and 2.

The blending amount of the dye in the entire amount of the treatment agent is not particularly limited, and the blending amount is, for example, in a range of 0.5% by weight to 20% by weight, preferably in a range of 1% by weight to 10% by weight, and more preferably in a range of 3% by weight to 7% by weight.

One type (kind) of the colorant may be used singly. Alternatively, two or more types (kinds) of the colorants may be used in combination.

Although the treatment agent may further contain a colorant as described above, it is not indispensable. That is, the treatment agent may not contain any colorant. For example, as will be described later, the ink set of the present teaching may further include a water-based ink. In this case, since a full color image is formed by using the water-based ink, it is preferred that the treatment agent contain no colorant. In a case that the ink set of the present teaching includes the water-based ink and the treatment agent containing the colorant, the treatment agent preferably contains the colorant in an amount to an extent not affecting the recorded image. The blending amount of the colorant in the treatment agent is preferably not more than 1% by weight, more preferably not more than 0.1% by weight, further preferably not more than 0.01% by weight.

The treatment agent may further contain water. The water is preferably ion-exchanged water or pure water (purified water). The blending amount of water (water ratio) in the entire amount of the treatment agent is, for example, in a range of 10% by weight to 98% by weight, and preferably in a range of 40% by weight to 98% by weight. The water may be contained, for example, as balance of the other components. The treatment agent may be usable as a treatment liquid which can be discharged from a recording head of an ink-jet recording apparatus.

The treatment agent may further contain a water-soluble organic solvent. As the water-soluble organic solvent, it is allowable to use publicly known products or substances. The water-soluble organic solvent is exemplified, for example, by polyvalent (polyhydric) alcohols, polyvalent alcohol derivatives, alcohols, amides, ketones, ketoalcohols (ketone alcohols), ethers, nitrogen-containing solvents, sulfur-containing solvents, propylene carbonate, ethylene carbonate, and 1,3-dimethyl-2-imidazolidinone. The polyvalent alcohols are, exemplified, for example, by glycerol, ethylene glycol, diethylene glycol, propylene glycol, butylene glycol, hexylene glycol, triethylene glycol, polyethylene glycol, dipropylene glycol, tripropylene glycol, polypropylene glycol, trimethylolpropane, 1,5-pentanediol, and 1,2,6-hexanetriol. The polyvalent alcohol derivatives are exemplified, for example, by ethylene glycol methyl ether, ethylene glycol ethyl ether, ethylene glycol-n-propyl ether, ethylene glycol-n-butyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. The alcohols are exemplified, for example, by methyl alcohol, ethyl alcohol, n-propyl alcohol, isopropyl alcohol, n-butyl alcohol, sec-butyl alcohol, isobutyl alcohol, tert-butyl alcohol, and benzyl alcohol. The amides are exemplified, for example, by dimethylformamide and dimethylacetamide. Examples of the ketones include acetone. Examples of the ketone alcohols (ketoalcohols) include diacetone alcohol. The ethers are exemplified, for example, by tetrahydrofuran and dioxane. The nitrogen-containing solvents are exemplified, for example, by pyrrolidone, 2-pyrrolidone, N-methyl-2-pyrrolidone, cyclohexyl pyrrolidone, and triethanolamine. The sulfur-containing solvents are exemplified, for example, by thiodiethanol, thiodiglycol, thiodiglycerol, sulfolane, and dimethylsulfoxide. The blending amount of the water-soluble organic solvent in the entire amount of the treatment agent is not particularly limited. One kind of the water-soluble organic solvent may be used singly, or two or more kinds of the water-soluble organic solvents may be used in combination.

The treatment agent may further contain a conventionally known additive, if necessary. The additive is exemplified, for example, by surfactants, viscosity-adjusting agents, surface tension-adjusting agents, antioxidants, and fungicides. The viscosity-adjusting agents are exemplified, for example, by polyvinyl alcohol, cellulose, and water-soluble resin.

The treatment agent can be prepared, for example, by mixing the fumed silica and other additive component(s) as necessary uniformly or homogeneously by any conventionally known method.

Subsequently, an explanation will be made about the bright pigment ink. The bright pigment ink contains the bright pigment and water.

The bright pigment is not particularly limited, which is exemplified, for example, by metallic particles and pearl pigments. The metallic particles are exemplified, for example, by particles of silver, aluminum, gold, platinum, nickel, chrome, tin, zinc, indium, titanium, and copper. The pearl pigments are exemplified, for example, by pearlescent pigments and pigments having interference brightness such as titanium dioxide coated mica, scaly flakes, and bismuth trichloride. One type (kind) of the bright pigment may be used singly. Alternatively, two or more types (kinds) of bright pigments may be used in combination. Among them, using silver particles or aluminum particles is preferred, and using silver particles is especially preferred.

The average particle size of the bright pigment is preferably in a range of 1 nm to 100 nm, and more preferably in a range of 5 nm to 50 nm. By making the average particle size of the bright pigment within the above range, the bright pigment can be dispersed in the bright pigment ink satisfactory and thus a recorded matter having better brightness can be obtained. The average particle size of the bright pigment can be measured in the similar manner as the average particle size of the fumed silica.

It is allowable to use, for example, any commercially available product as the bright pigment. The commercially available product is exemplified, for example, by "Silver Nanocolloid H-1 (silver concentration 20%, aqueous dispersion)" (average particle size: 20 nm), "Silver Nanocolloid A-1 (silver concentration 10%, aqueous dispersion)", and "Silver Nanocolloid A-2 (silver concentration 10%, aqueous dispersion)" produced by Mitsubishi Materials Electronic Chemicals Co., Ltd.; "Product number 730785 (silver concentration 0.1%, buffer dispersion)", "Product number 730793 (silver concentration 0.1%, buffer dispersion)", "Product number 730807 (silver concentration 0.1%, buffer dispersion)", "Product number 730815 (silver concentration 0.1%, buffer dispersion)", and "Product number 730777 (silver concentration 0.1%, buffer dispersion)" produced by Sigma-Aldrich Co. LLC.; "PChem/DOWA Nano Ink (silver concentration 20%, aqueous dispersion)" produced by DOWA HOLDINGS Co., Ltd.; "Silver Nano Ink (silver concentration 20%, aqueous dispersion)" produced by MITSUBISHI PAPER MILLS LIMITED.; and "Ag-Cu Nanoparticle Paste NAGNCU15-K01" produced by DAIKEN CHEMICAL CO., LTD.

The blending amount of the bright pigment in the entire amount of the bright pigment ink (bright pigment ratio) is, for example, in a range of 0.5% by weight to 20% by weight, preferably in a range of 1% by weight to 12% by weight, and more preferably in a range of 2% by weight to 10% by weight. By making the bright pigment ratio in the range of 1% by weight to 12% by weight, a recorded matter with better brightness can be obtained. By making the bright pigment ratio in the range of 2% by weight to 10% by weight, a recorded matter with much better brightness can be obtained. From the viewpoint of discharge stability, it is further preferred that the bright pigment ratio be in a range of 2% by weight to 5% by weight.

The water is preferably ion-exchanged water or pure water (purified water). The blending amount of water (water ratio) in the entire amount of the bright pigment ink is, for example, in a range of 10% by weight to 80% by weight, and preferably in a range of 40% by weight to 80% by weight. The water ratio may be, for example, the balance of the other components.

In a case that the treatment agent contains no urethane resin, the bright pigment ink contains the urethane resin. On the other hand, in a case that the treatment agent contains the urethane resin, the bright pigment ink may not contain the urethane resin. The kinds of urethane resins are the same as those described in the treatment agent.

In the ink set of the present teaching, in a case that the urethane resin is contained only in the bright pigment ink (no urethane resin is contained in the treatment agent), it is possible to shorten the drying time of the treatment agent. For example, in a case that the treatment agent and the bright pigment ink of the ink set of the present teaching are applied onto a recording medium in this order, the treatment agent having a good drying property can reduce the time after the application of the treatment agent before the discharge of the bright pigment ink. This improves the whole throughput.

In the case that the bright pigment ink contains the urethane resin, the blending amount of the urethane resin (urethane resin ratio) in the entire amount of the bright pigment ink is, for example, in a range of 0.05% by weight to 2.5% by weight, preferably in a range of 0.1% by weight to 2% by weight, and more preferably in a range of 0.1% by weight to 1.5% by weight. By making the urethane resin ratio 0.1% by weight or more, a recorded matter having better brightness and fixation can be obtained.

In the ink set of the present teaching, in the case that the bright pigment ink contains the urethane resin, it is preferred that the bright pigment ink contain the bright pigment and the urethane resin to satisfy the following conditions (C) and (D).

$$2 \leq L/M \leq 30 \qquad (C)$$

$$1.2 \leq L+M \leq 12 \qquad (D)$$

L: a blending amount (% by weight) of the bright pigment in the bright pigment ink M: a blending amount (% by weight) of the urethane resin in the bright pigment ink By satisfying $2 \leq L/M$, the blur, unevenness, and black discoloration due to the reflectance reduction of light are inhibited further, and thus a recorded matter having better brightness can be obtained. By satisfying $L/M \leq 30$, a recorded matter having better fixation can be obtained. By satisfying $1.2 \leq L+M$, a recorded matter having better brightness can be obtained.

In the ink set of the present teaching, in the case that the bright pigment ink contains the urethane resin, it is further preferred that the bright pigment ink contain the bright pigment and the urethane resin to satisfy the following conditions (C1) and (D1).

$$2 \leq L/M \leq 15 \qquad (C)$$

$$1.2 \leq L+M \leq 9.5 \qquad (D)$$

L: a blending amount (% by weight) of the bright pigment in the bright pigment ink M: a blending amount (% by weight) of the urethane resin in the bright pigment ink A recorded matter having much better fixation can be obtained by satisfying $L/M \leq 15$.

In the ink set of the present teaching, in the case that the bright pigment ink contains the urethane resin, it is still further preferred that the bright pigment ink contain the bright pigment and the urethane resin to satisfy the following conditions (C2) and (D2).

$$3 \leq L/M \leq 10 \qquad (C2)$$

$$2.2 \leq L+M \leq 9 \qquad (D2)$$

L: a blending amount (% by weight) of the bright pigment in the bright pigment ink M: a blending amount (% by weight) of the urethane resin in the bright pigment ink By satisfying $3 \leq L/M$, the blur, unevenness, and black discoloration due to the reflectance reduction of light are inhibited even still further, and thus a recorded matter having even much better brightness can be obtained. By satisfying $L/M \leq 10$, a recorded matter having even much better fixation can be obtained. By satisfying $2.2 \leq L+M$, a recorded matter having even much better brightness can be obtained.

It is preferred that the bright pigment ink further contain a water-soluble organic solvent. The water-soluble organic solvent is exemplified, for example, by a humectant which prevents the bright pigment ink from drying at an end of a nozzle in an ink-jet head and a penetrant which adjusts a drying rate of the bright pigment ink on a recording medium.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, trimethylolethane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. One type (kind) of the humectant as described above may be used singly, or two or more types (kinds) of the humectants as described above may be used in combination. Among them, it is preferable to use polyvalent alcohols such as alkylene glycol and glycerol.

The blending amount of the humectant in the entire amount of the bright pigment ink, is for example, in a range of 0% by weight to 95% by weight, preferably in a range of 5% by weight to 80% by weight, and more preferably in a range of 5% by weight to 50% by weight.

The penetrant is exemplified, for example, by glycol ether. The glycol ether is exemplified, for example, by ethylene glycol methyl ether, ethylene glycol ethyl ether, ethylene glycol n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. One type (kind) of the penetrant as described above may be used singly, or two or more types (kinds) of the penetrants as described above may be used in combination.

The blending amount of the penetrant in the entire amount of the bright pigment ink is, for example, in a range of 0% by weight to 20% by weight, preferably in a range of 0.1% by weight to 15% by weight, and more preferably in a range of 1% by weight to 5% by weight.

The bright pigment ink may further contain a conventionally known additive, if necessary. The additive is exemplified, for example, by surfactants, pH-adjusting agents, viscosity-adjusting agents, surface tension-adjusting agents, and fungicides. The viscosity-adjusting agents are exemplified, for example, by polyvinyl alcohol, cellulose, and water-soluble resin.

The bright pigment ink can be prepared, for example, as follows. That is, the bright pigment, water, and other additive component(s) as necessary are mixed uniformly in accordance with any conventionally known method, and undissolved matters are removed by a filter or the like.

The ink set of the present teaching may include, in addition to the treatment agent and the bright pigment ink, a water-based ink containing a colorant and water. As described above, in the ink set of the present teaching, the treatment agent may contain the colorant. Thus, all of the colors can have excellent brightness. However, even when the treatment agent contains no colorant, all of the colors (full color) can have brightness provided that the ink set of the present teaching includes the water-based ink containing the colorant. The ink set of the present teaching may include a plurality of water-based inks such as a water-based cyan ink, a water-based magenta ink, a water-based yellow ink, and a water-based black ink.

The colorant contained in the water-based ink may be either a pigment or a dye. The mixture of the pigment and the dye may be used as the colorant. As the colorant contained in the water-based ink, it is possible to use any of them used in the treatment agent which are exemplified above. The blending amount of the colorant in the entire amount of the water-based ink is not particularly limited, and the blending amount is, for example, in a range of 0.5% by weight to 20% by weight, preferably in a range of 1% by weight to 15% by weight, and more preferably in a range of 2% by weight to 10% by weight.

The water is preferably ion-exchanged water or pure water (purified water). The blending amount of the water (water ratio) in the entire amount of the water-based ink is, for example, in a range of 10% by weight to 98% by weight, and preferably in a range of 40% by weight to 98% by weight. The water ratio may be, for example, the balance of the other components.

It is preferred that the water-based ink further contain a water-soluble organic solvent. The water-soluble organic solvent is exemplified, for example, by a humectant which prevents the water-based ink from drying at an end of a nozzle in an ink-jet head and a penetrant which adjusts a drying rate of the water-based ink on a recording medium. As the humectant and the penetrant, it is possible to use any of them used in the bright pigment ink which are exemplified above. The blending amount of the humectant in the entire amount of the water-based ink is, for example, in a range of 0% by weight to 95% by weight, preferably in a range of 5% by weight to 80% by weight, and more preferably in a range of 5% by weight to 50% by weight. The blending amount of the penetrant in the entire amount of the water-based ink is, for example, in a range of 0% by weight to 20% by weight, preferably in a range of 0.1% by weight to 15% by weight, and more preferably in a range of 1% by weight to 5% by weight.

The water-based ink may further contain a conventionally known additive, if necessary. The additive is exemplified, for example, by surfactants, pH-adjusting agents, viscosity-adjusting agents, surface tension-adjusting agents, and fungicides. The viscosity-adjusting agents are exemplified, for example, by polyvinyl alcohol, cellulose, and water-soluble resin.

The water-based ink can be prepared, for example, as follows. That is, the colorant, water, and other additive component(s) as necessary are mixed uniformly in accordance with any conventionally known method, and undissolved matters are removed by a filter or the like.

It is especially preferred that the ink set of the present teaching be obtained to meet the following conditions: the treatment agent contains the fumed silica and at least one of the treatment agent and the bright pigment ink contains the urethane resin to satisfy the above conditions (A1) and (B1); the fumed silica has an average particle size of 150 nm or less; the urethane resin particles, contained in the urethane emulsion, having an average particle size of 150 nm or less are used as the urethane resin; and the bright pigment ratio is in a range of 2% by weight to 10% by weight. The ink set of the present teaching obtained as described above can obtain a recorded matter in which a blur and unevenness are strongly inhibited and brightness and fixation are extremely good.

In the case that the bright pigment ink contains the urethane resin, it is especially preferred that the ink set of the present teaching be obtained to meet the following conditions: the bright pigment ink contains the bright pigment and the urethane resin to satisfy the conditions (C2) and (D2); and the urethane resin particles, contained in the urethane emulsion, having an average particle size of 150 nm or less are used as the urethane resin. The ink set of the present teaching prepared as described above can obtain a recorded matter in which a blur and unevenness are strongly inhibited and brightness and fixation are extremely good.

The ink set of the present teaching can be also provided as an ink cartridge. For example, the ink cartridge of the present teaching has a treatment agent accommodating section and an ink accommodating section. The treatment agent constituting the ink set of the present teaching is accommodated in the treatment agent accommodating section, and the bright pigment ink constituting the ink set of the present teaching is accommodated in the ink accommodating section. The ink cartridge of the present teaching may have an accommodating section for any water-based ink other than the bright pigment ink constituting the ink set of the present teaching.

The ink cartridge of the present teaching may be an ink cartridge assembly wherein an ink cartridge and a treatment agent cartridge formed individually and independently from the ink cartridge are assembled. Alternatively, the ink cartridge of the present teaching may be an integrated type ink cartridge of which interior is comparted to form the treatment agent accommodating section and the ink accommodating section. For example, any conventionally known main body (body) of an ink cartridge can be used for the main body of the ink cartridge of the present teaching.

Next, an explanation will be made about the recording method and an ink-jet recording apparatus of the present teaching.

The recording method of the present teaching includes a pretreatment step and a recording step, the pretreatment step being a step for applying a treatment agent on a recording medium, the recording step being a step for performing recording by discharging a bright pigment ink in accordance with the ink-jet system on the recording medium to which the treatment agent has been applied. In the recording method of the present teaching, the treatment agent and the bright pigment ink constituting the ink set of the present teaching are used as the treatment agent and the bright pigment ink.

The ink-jet recording apparatus of the present teaching includes an ink set accommodating section, a treatment agent application mechanism, and an ink discharge mechanism. In the ink-jet recording apparatus of the present teaching, the ink set accommodating section accommodates the ink set of the present teaching, the treatment agent application mechanism applies the treatment agent constituting the ink set onto a recording medium, and the ink discharge mechanism discharges the bright pigment ink constituting the ink set onto the recording medium.

The ink-jet recording method of the present teaching can be performed, for example, by using the ink-jet recording apparatus of the present teaching. The recording includes printing text (character, letter), printing image or picture, printing, etc.

FIG. 1 depicts an exemplary construction of the ink-jet recording apparatus of the present teaching. As depicted in FIG. 1, an ink-jet recording apparatus 1 includes, as main constitutive elements, an ink cartridge assembly 2, an ink discharge mechanism (ink-jet head) 3, a head unit 4, a carriage 5, a drive unit 6, a platen roller 7, and a purge unit 8.

The ink cartridge assembly 2 includes a treatment agent cartridge 2a, a bright pigment ink cartridge 2b, and four water-based ink cartridges 2c. The treatment agent cartridge 2a contains the treatment agent constituting the ink set of the present teaching. The bright pigment ink cartridge 2b contains the bright pigment ink constituting the ink set of the present teaching. The four water-based ink cartridges 2c respectively contain four water-based inks of yellow, magenta, cyan, and black. At least one of the four water-based inks may be the bright pigment ink constituting the ink set for the present teaching. In this case, the ink cartridge assembly 2 may be constructed only of the treatment agent cartridge 2a and the four water-based ink cartridges 2c without providing the bright pigment ink cartridge 2b.

The ink-jet head 3, which is installed on the head unit 4, performs recording on a recording medium P (for example, recording sheet). The ink cartridge assembly 2 and the head unit 4 are carried on the carriage 5. The driving unit 6 reciprocatively moves the carriage 5 in a linear direction. For example, a conventionally known driving unit can be used as the driving unit 6 (see, for example, Japanese Patent Application Laid-open No. 2008-246821 corresponding to United States Patent Application Publication No. US 2008/0241398). The platen roller 7 extends in the reciprocating direction of the carriage 5, and the platen roller 7 is disposed to face the ink-jet head 3.

The purge unit 8 sucks any defective ink including bubbles and the like remaining at the inside of the ink-jet head 3. For example, a conventionally known purge unit can be used as the purge unit 8 (see, for example, Japanese Patent Application Laid-open No. 2008-246821 corresponding to United States Patent Application Publication No. US 2008/0241398).

A wiper member 20 is provided on the purge unit 8, at a position on the side of the platen roller 7 such that the wiper member 20 is adjacent to the purge unit 8. The wiper member 20 is formed to have a spatula form, and wipes a nozzle-formation surface of the ink-jet head 3 accompanying with the movement (reciprocating movement) of the carriage 5. In FIG. 1, a cap 18 is provided to cover a plurality of nozzles of the ink-jet head 3 which is returned to a reset position upon completion of the recording, so as to prevent the treatment agent, the bright pigment ink, and the water-based inks from drying.

In the ink-jet recording apparatus 1 of this example, the ink cartridge assembly 2 is provided, together with the head unit 4, on one carriage 5. Note that, however, the present teaching is not limited to this. In the ink-jet recording apparatus 1, the respective cartridges of the ink cartridge assembly 2 may be provided on another carriage which is different from that for the head unit 4. Alternatively, the respective cartridges of the ink cartridge assembly 2 may be arranged and fixed inside the ink-jet recording apparatus 1, rather than being provided on the carriage 5. In such an aspect, for example, the respective cartridges of the ink cartridge assembly 2 and the head unit 4 which is provided on the carriage 5 are connected with tubes, etc., and the treatment agent, the bright pigment ink, and the water-based inks are supplied from the respective cartridge of the ink cartridge assembly 2 to the head unit 4 via the tubes.

Figure 2A:
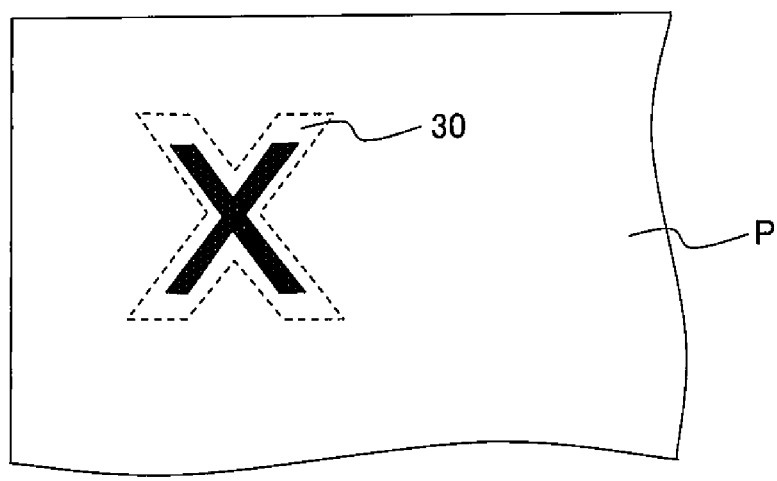
FIGS. 2A and 2B are diagrams each depicting a recording example by a recording method of the present teaching.
Figure 2B:
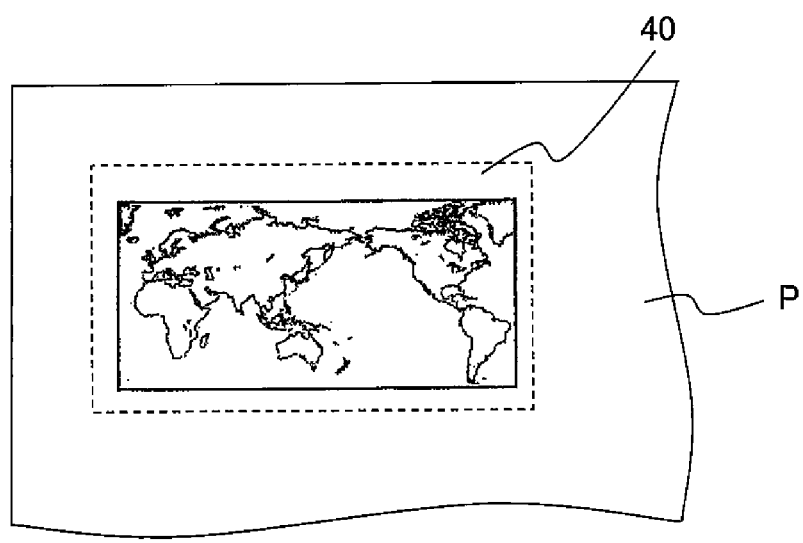

The recording, which uses the ink-jet recording apparatus 1, is carried out, for example, as follows. First, a recording sheet P is supplied from a feed cassette (not depicted) provided in the ink-jet recording apparatus 1 on a side part or lower part thereof. The recording sheet P is introduced between the ink-jet head 3 and the platen roller 7. The treatment agent constituting the ink set of the present teaching is applied (discharged) from the ink-jet head 3 onto the introduced recording sheet P. The treatment agent may be applied over the entire recording surface of the recording sheet P or on a part of the recording surface of the recording sheet P. In a case of applying the treatment agent onto a part of the recording surface of the recording sheet P, at least a part, of the recording sheet P, on which recording is to be performed with the bright pigment ink, is an application portion of the treatment agent. Further, it is preferred that the size of the application portion of the treatment agent be greater than the size of the recorded portion with the bright pigment ink. For example, as depicted in FIG. 2A, in a case that a letter "X" is recorded on a recording sheet P, it is preferred that the treatment agent be applied on the recording sheet P to form an application portion 30 of which line width is greater than the line width of the letter "X". Further, as depicted in FIG. 2B, in a case that a pattern, an image, or the like is recorded on a recording sheet P, it is preferred that the treatment agent be applied on the recording sheet P to form an application portion 40, the size of which is greater than that of the pattern or the like. Here, in a case that the treatment agent contains no urethane resin but the bright pigment ink contains the urethane resin, it is possible to shorten the drying time of the treatment agent.

Next, predetermined recording is performed on the application portion of the treatment agent of the recording sheet P by use of the bright pigment ink discharged from the ink-jet head 3. The time (time interval) from the discharge of the treatment agent until the discharge of the bright pigment ink is not particularly limited. For example, it is allowable to perform the discharge of the bright pigment ink in the same scanning during which the discharge of the treatment agent is also performed. A recorded matter obtained by using the ink set of the present teaching hardly suffers from the unevenness and blur and has excellent brightness, even when a recording medium having poor surface smoothness such as plain paper and matte paper is used as the recording sheet P. The recording with the water-based ink(s) discharged from the ink-jet head 3 is performed as needed, and then the recording sheet P on which the recording has been performed is discharged from the ink-jet recording apparatus 1. In FIG. 1, illustrations of a feed mechanism and a discharge mechanism for the recording sheet P are omitted.

In the ink-jet recording apparatus 1 of this example, the ink-jet head 3 functions also as the treatment agent application mechanism. The present teaching, however, is not limited to this. In the present teaching, the application of the treatment agent may be performed, for example, by a system or method such as stamp coating (application), brush coating, and roller coating.

Although the apparatus depicted in FIG. 1 adopts an ink-jet head of the serial type, the present teaching is not limited to this. The ink-jet recording apparatus may be an apparatus adopting an ink-jet head of the line type.

As described above, in the ink set of the present teaching, the treatment agent, which is to be applied on a recording medium before ink-jet recording, contains the fumed silica and at least one of the treatment agent and the bright pigment ink contains the urethane resin. Thus, the ink set of the present teaching can obtain a recorded matter in which a blur and unevenness are inhibited and brightness is good, even when a recording medium having poor surface smoothness is used. Further, as for the ink set of the present teaching in which the treatment agent contains the fumed silica and only the bright pigment ink contains the urethane resin, a secondary effect to reduce the drying time of the treatment agent can be provided.

EXAMPLES

Next, examples of the present teaching will be explained together with comparative examples. Note that the present teaching is not limited and is not restricted to the examples and the comparative examples which will be described below.

Examples 1-1 to 1-21 and Comparative Examples 1-1 to 1-8

<Preparation of Treatment Agent>
Respective components indicated in a treatment agent composition (TABLE 1) were mixed uniformly or homogeneously, thereby obtaining each of the treatment agents 1 to 23. In TABLE 1, the unit of the composition of each of the treatment agents is % by weight, and each numerical value in TABLE 1 indicates an active-ingredient amount (solid content amount).
<Preparation of Bright Pigment Ink>
Components, except for the bright pigment, which were included in a bright pigment ink composition (TABLE 2) were mixed uniformly or homogeneously, thereby obtaining an ink solvent. Subsequently, the ink solvent was added to the bright pigment, followed by being mixed uniformly. After that, the obtained mixture was filtrated through a cellulose acetate membrane filter (pore size 3.00 μm) produced by Toyo Roshi Kaisha, Ltd., and thereby obtaining each of the bright pigment inks 1-1 to 1-7. In TABLE 2, the unit of the composition of each of the bright pigment inks is % by weight, and each numerical value in TABLE 2 indicates an active-ingredient amount (solid content amount).

Table 1 (Following)—Legend

*1: Produced by Cabot Corporation; the average particle size, which was measured by using the dynamic light scattering particle size analyzer "LB-550" manufactured by HORIBA, Ltd., was 150 nm
*2: Produced by Cabot Corporation; the average particle size, which was measured by using the dynamic light scattering particle size analyzer "LB-550" manufactured by HORIBA, Ltd., was 230 nm
*3: Produced by NISSAN CHEMICAL INDUSTRIES, LTD.; average particle size: 10 to 20 nm
*4: Produced by NISSAN CHEMICAL INDUSTRIES, LTD.; average particle size: 200 nm
*5: Produced by FUSO CHEMICAL, CO., LTD.; average particle size: 125 nm
*6: Produced by Sanyo Chemical Industries, Ltd.; average particle size: 20 nm

*7: Produced by Sanyo Chemical Industries, Ltd.; average particle size: 70 nm
*8: Produced by Sanyo Chemical Industries, Ltd.; average particle size: 300 nm
*9: Acylic resin; produced by SEIKO PMC CORPORATION; average particle size: 40 nm
*10: Acrylic resin; produced by SEIKO PMC CORPORATION; average particle size: 80 nm
*11: Styrene-acryl resin; produced by SEIKO PMC CORPORATION; average particle size: 250 nm
*12: Acetylene glycol surfactant (ethylene oxide (10 mol) adduct of diol); produced by Nissin Chemical Co., Ltd; active-ingredient: 100%
*13: Sodium polyoxyethylene alkyl (C=12, 13) ether sulfate (3E.O); produced by Lion Corporation; active-ingredient: 28% by weight

TABLE 1

| | | Treatment agents (% by weight) | | | | | | | | | |
|---|---|---|---|---|---|---|---|---|---|---|---|
| | | 1 | 2 | 3 | 4 | 5 | 6 | 7 | 8 | 9 | 10 |
| Fumed Silica (X) | CAB-O-SPERSE(trade name) PG002 (*1) | 15 | 8 | 24 | 20 | 6 | 26 | 20 | 4 | 30 | 26 |
| | CAB-O-SPERSE(trade name) PG001 (*2) | — | — | — | — | — | — | — | — | — | — |
| Colloidal Silica (X) | SNOWTEX(trade name) 20 (*3) | — | — | — | — | — | — | — | — | — | — |
| | SNOWTEX(trade name) MP-2400 (*4) | — | — | — | — | — | — | — | — | — | — |
| | PL-7 (*5) | — | — | — | — | — | — | — | — | — | — |
| Urethane resin (Y) | UCOAT (trade name) UWS-145 (*6) | 5 | 2 | 6 | — | 2 | 6 | 9 | 1 | 6 | 13 |
| | PERMARIN (trade name) UA-150 (*7) | — | — | — | 8 | — | — | — | — | — | — |
| | PERMARIN (trade name) UA-368 (*8) | — | — | — | — | — | — | — | — | — | — |
| Other resin (Y) | F-52 (*9) | — | — | — | — | — | — | — | — | — | — |
| | KE-1148 (*10) | — | — | — | — | — | — | — | — | — | — |
| | PE-1304 (*11) | — | — | — | — | — | — | — | — | — | — |
| Humectant | Glycerol | — | — | 5 | — | — | — | — | — | — | — |
| | Triethylene glycol | — | — | — | — | — | — | — | — | — | 5 |
| Penetrant | Triethylene glycol n-butyl ether | — | 1 | — | — | — | — | 3 | — | — | — |
| Surfactant | OLFINE(trade name) E1010 (*12) | — | 0.5 | — | — | — | 1 | — | — | 2 | — |
| | SUNNOL(trade name) NL-1430 (*13) | — | — | — | — | — | — | — | 1 | — | — |
| Water | | balance | balance | balance | balance | balance | balance | balance | balance | balance | balance |
| X/Y | | 3.0 | 4.0 | 4.0 | 2.5 | 3.0 | 4.3 | 2.2 | 4.0 | 5.0 | 2.0 |
| X + Y (% by weight) | | 20 | 10 | 30 | 28 | 8 | 32 | 29 | 5 | 36 | 39 |

| | | Treatment agents (% by weight) | | | | | | | | | |
|---|---|---|---|---|---|---|---|---|---|---|---|
| | | 11 | 12 | 13 | 14 | 15 | 16 | 17 | 18 | 19 | 20 |
| Fumed Silica (X) | CAB-O-SPERSE(trade name) PG002 (*1) | 3 | 32 | 27 | — | 26 | 15 | — | — | — | — |
| | CAB-O-SPERSE(trade name) PG001 (*2) | — | — | — | 20 | — | — | — | — | — | — |
| Colloidal Silica (X) | SNOWTEX(trade name) 20 (*3) | — | — | — | — | — | — | — | 15 | — | — |
| | SNOWTEX(trade name) MP-2400 (*4) | — | — | — | — | — | — | — | — | 8 | — |
| | PL-7 (*5) | — | — | — | — | — | — | — | — | — | 24 |
| Urethane resin (Y) | UCOAT (trade name) UWS-145 (*6) | 1 | 6 | 15 | 9 | — | — | 10 | 5 | 2 | 6 |
| | PERMARIN (trade name) UA-150 (*7) | — | — | — | — | — | — | — | — | — | — |
| | PERMARIN (trade name) UA-368 (*8) | — | — | — | — | 6 | — | — | — | — | — |
| Other resin (Y) | F-52 (*9) | — | — | — | — | — | — | — | — | — | — |
| | KE-1148 (*10) | — | — | — | — | — | — | — | — | — | — |
| | PE-1304 (*11) | — | — | — | — | — | — | — | — | — | — |
| Humectant | Glycerol | — | — | — | — | — | — | — | — | — | — |
| | Triethylene glycol | — | — | — | — | — | — | — | — | — | — |
| Penetrant | Triethylene glycol n-butyl ether | — | — | — | — | — | — | — | — | — | — |
| Surfactant | OLFINE(trade name) E1010 (*12) | — | — | — | — | — | — | — | — | — | — |
| | SUNNOL(trade name) NL-1430 (*13) | — | — | — | — | — | — | — | — | — | — |
| Water | | balance | balance | balance | balance | balance | balance | balance | balance | balance | balance |
| X/Y | | 3.0 | 5.3 | 1.8 | 2.2 | 4.3 | — | 0 | 3.0 | 4.0 | 4.0 |
| X + Y (% by weight) | | 4 | 38 | 42 | 29 | 32 | 15 | 10 | 20 | 10 | 30 |

TABLE 1-continued

| | | Treatment agents (% by weight) | | |
|---|---|---|---|---|
| | | 21 | 22 | 23 |
| Fumed Silica (X) | CAB-O-SPERSE(trade name) PG002 (*1) | 15 | 8 | 24 |
| | CAB-O-SPERSE(trade name) PG001 (*2) | — | — | — |
| Colloidal Silica (X) | SNOWTEX(trade name) 20 (*3) | — | — | — |
| | SNOWTEX(trade name) MP-2400 (*4) | — | — | — |
| | PL-7 (*5) | — | — | — |
| Urethane resin (Y) | UCOAT (trade name) UWS-145 (*6) | — | — | — |
| | PERMARIN (trade name) UA-150 (*7) | — | — | — |
| | PERMARIN (trade name) UA-368 (*8) | — | — | — |
| Other resin (Y) | F-52 (*9) | 5 | — | — |
| | KE-1148 (*10) | — | 2 | — |
| | PE-1304 (*11) | — | — | 6 |
| Humectant | Glycerol | — | — | — |
| | Triethylene glycol | — | — | — |
| Penetrant | Triethylene glycol n-butyl ether | — | — | — |
| Surfactant | OLFINE(trade name) E1010 (*12) | — | — | — |
| | SUNNOL(trade name) NL-1430 (*13) | — | — | — |
| Water | | balance | balance | balance |
| X/Y | | 3.0 | 4.0 | 4.0 |
| X + Y (% by weight) | | 20 | 10 | 30 |

Table 2 (Following)—Legend

*14: Produced by Mitsubishi Materials Electronic Chemicals Co., Ltd.; average particle size: 20 nm
*12: Acetylene glycol surfactant (ethylene oxide (10 mol) adduct of diol); produced by Nissin Chemical Co., Ltd; active-ingredient: 100%
*13: Sodium polyoxyethylene alkyl (C=12, 13) ether sulfate (3E.O); produced by Lion Corporation; active-ingredient: 28% by weight
*15: Produced by Arch Chemicals

TABLE 2

| | | Bright pigment inks (% by weight) | | | | | | |
|---|---|---|---|---|---|---|---|---|
| | | 1-1 | 1-2 | 1-3 | 1-4 | 1-5 | 1-6 | 1-7 |
| Bright pigment | Silver Nanocolloid H-1 (*14) | 0.8 | 1 | 2 | 4 | 10 | 12 | 14 |
| Humectant | Glycerol | 30 | 30 | 15 | 30 | 28 | 30 | 25 |
| | Triethylene glycol | — | — | 15 | — | — | — | — |
| Penetrant | Triethylene glycol n-butyl ether | — | — | — | — | 2 | — | — |
| Surfactant | OLFINE(trade name) E1010 (*12) | 1 | — | 0.5 | 1 | 1 | 2 | 1 |
| | SUNNOL(trade name) NL-1430 (*13) | — | 1 | — | — | — | — | — |
| Fungicide | Proxel GXL(S) (*15) | 0.1 | 0.1 | 0.1 | 0.1 | 0.1 | 0.1 | 0.1 |
| Water | | balance | balance | balance | balance | balance | balance | balance |

As indicated in TABLE 3, the treatment agent was combined with the bright pigment ink, thereby obtaining each of the ink sets of Examples 1-1 to 1-21 and Comparative Examples 1-1 to 1-8.

There were performed (a) evaluation of brightness of the recorded portion, (b) evaluation of image quality (unevenness and blur) of the recorded portion, (c) evaluation of fixation of the recorded portion, and (d) overall evaluation on the ink sets of Examples 1-1 to 1-21 and Comparative Examples 1-1 to 1-8 by the following methods. The samples used in the evaluations (a), (b), and (c) were prepared as follows.

<Preparation of Evaluation Samples>

The treatment agent constituting each of the ink sets of Examples 1-1 to 1-21 and Comparative Examples 1-1 to 1-8 was applied on a matte paper (BP60MA, produced by BROTHER KOGYO KABUSHIKI KAISHA) with a bar coater (Bar Coater, Rod No. 3 produced by Yasuda Seiki Seisakusho, Ltd.). Subsequently, an ink-jet printer MFC-J4510N produced by BROTHER KOGYO KABUSHIKI KAISHA was used to record an image with the bright pigment ink constituting each of the ink sets of Examples 1-1 to 1-21 and Comparative Examples 1-1 to 1-8 on the matte paper at a resolution of 600dpi×2400 dpi.

(a) Evaluation of Brightness of the Recorded Portion

The solid portion of each of the evaluation samples was observed visually, and the brightness of the image was evaluated in accordance with the following evaluation criterion.

<Evaluation of Brightness of the Recorded Portion and Evaluation Criterion>

AA: The brightness was sufficient.

A: The brightness was slightly inferior.

B: The brightness was somewhat inferior, but no problem for practical use.

C: There was no brightness, which would cause a problem for practical use.

(a) Evaluation of Image Quality (Unevenness and Blur) of the Recorded Portion

The solid portion of each of the evaluation samples was observed visually, and the image quality (unevenness and blur) was evaluated in accordance with the following evaluation criterion.

<Evaluation of Image Quality (Unevenness and Blur) of the Recorded Portion and Evaluation Criterion>

AA: Neither unevenness nor blur was observed.

A: Unevenness and blur were slightly observed.

B: Unevenness and blur were observed to some extent, but no problem for practical use.

C: Unevenness and blur were observed clearly, which would cause a problem for practical use.

(c) Evaluation of Fixation of the Recorded Portion

The solid portion of each of the evaluation samples was rubbed with a finger 30 seconds after the recording. The rubbing-off of the bright pigment ink was visually observed, and the fixation was evaluated in accordance with the following criterion.

<Evaluation of Fixation of the Recorded Portion and Evaluation Criterion>

AA: The recorded portion had no rubbing-off.

A: The recorded portion had rubbing-off slightly.

B: The recorded portion had rubbing-off to some extent, but no problem for practical use.

C: The recorded portion had rubbing-off clearly, which would cause a problem for practical use.

(d) Overall Evaluation

The overall evaluation was performed based on the results (a) to (c) in accordance with the following criterion.

<Overall Evaluation and Evaluation Criterion>

G: All of the results (a) to (c) were any of "AA", "A", and "B".

NG: There was "C" in any of the results (a) to (c).

The evaluation results of Examples 1-1 to 1-21 and Comparative Examples 1-1 to 1-8 are indicated in TABLE 3.

TABLE 3

| | Examples | | | | | | | | | | | | | |
|---|---|---|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 | 1-12 | 1-13 | 1-14 |
| Treatment agent | | | | 1 | | | | 2 | 3 | 4 | 5 | 6 | 7 | 8 |
| Bright pigment ink | 1-1 | 1-2 | 1-3 | 1-4 | 1-5 | 1-6 | 1-7 | | | | 1-4 | | | |
| Brightness of recorded portion | B | A | AA | AA | AA | AA | AA | AA | AA | AA | A | AA | AA | A |
| Image quality of recorded portion (Unevenness and Blur) | AA | AA | AA | AA | AA | AA | AA | AA | AA | AA | AA | A | A | AA |
| Fixation of recorded portion | AA | AA | AA | AA | AA | A | B | AA | AA | AA | AA | A | AA | AA |
| Overall evaluation | G | G | G | G | G | G | G | G | G | G | G | G | G | G |

| | Examples | | | | | | | Comparative Examples | | | | | | | |
|---|---|---|---|---|---|---|---|---|---|---|---|---|---|---|---|
| | 1-15 | 1-16 | 1-17 | 1-18 | 1-19 | 1-20 | 1-21 | 1-1 | 1-2 | 1-3 | 1-4 | 1-5 | 1-6 | 1-7 | 1-8 |
| Treatment agent | 9 | 10 | 11 | 12 | 13 | 14 | 15 | 16 | 17 | 18 | 19 | 20 | 21 | 22 | 23 |
| Bright pigment ink | | | | | | | | 1-4 | | | | | | | |
| Brightness of recorded portion | AA | AA | B | AA | AA | A | A | A | A | C | C | C | C | C | C |
| Image quality of recorded portion (Unevenness and Blur) | A | A | AA | B | B | A | A | AA | C | AA | AA | AA | C | C | C |
| Fixation of recorded portion | A | AA | AA | B | AA | AA | A | C | A | AA | AA | AA | AA | AA | AA |
| Overall evaluation | G | G | G | G | G | G | G | NG | NG | NG | NG | NG | NG | NG | NG |

As indicated in TABLE 3, Examples 1-1 to 1-21 had good evaluation results of all of the brightness of the recorded portion, the image quality (unevenness and blur) of the recorded portion, and the fixation of the recorded portion. Especially, Examples 1-3 to 1-5 and 1-8 to 1-10 had extremely good evaluation results of all of the brightness of the recorded portion, the image quality (unevenness and blur) of the recorded portion, and the fixation of the recorded portion, each of Examples 1-3 to 1-5 and 1-8 to 1-10 being obtained to meet the following conditions: the treatment agent contained the fumed silica and at least one of the treatment agent and the bright pigment ink contained the urethane resin to satisfy the conditions (A1) and (B1); the fumed silica had an average particle size of 150 nm or less; the urethane resin particles, contained in the urethane emulsion, having an average particle size of 150 nm or less were used as the urethane resin; and the bright pigment ratio was in a range of 2% by weight to 10% by weight.

When Example 1-12 is compared to Example 1-21, Example 1-12 had a better evaluation result of the brightness of the recorded portion than that of Example 1-21, Example 1-12 being obtained by use of the treatment agent 6 in which the average particle size (20 nm) of the urethane resin particles contained in the urethane emulsion was smaller than the average particle size (150 nm) of the fumed silica, Example 1-21 being obtained by use of the treatment agent 15 in which the average particle size (300 nm) of the urethane resin particles contained in the urethane emulsion was larger than the average particle size (150 nm) of the fumed silica.

Meanwhile, Comparative Example 1-1 in which neither the treatment agent nor the bright pigment ink contained the urethane resin had a bad evaluation result of the fixation of the recorded portion. Comparative Example 1-2 in which the treatment agent contained no fumed silica had a bad evaluation result of the image quality (unevenness and blur) of the recorded portion. Each of Comparative Examples 1-3 to 1-5 in which the treatment agent contained colloidal silica instead of the fumed silica had a bad evaluation result of the brightness of the recorded portion. Each of Comparative Examples 1-6 to 1-8 in which the treatment agent contained resin other than the urethane resin had bad evaluation results of the brightness of the recorded portion and the image quality (unevenness and blur) of the recorded portion.

Examples 2-1 to 2-25 and Comparative Examples 2-1 to 2-19

<Preparation of Treatment Agent>

Respective components indicated in a treatment agent composition (TABLE 4) were mixed uniformly or homogeneously, thereby obtaining each of the treatment agents YP1 to YP 22, MP1 to MP3, CP1 to CP4, KP1 to KP3, YD1 to YD3, MD1 to MD3, and CD1 and CD2. In TABLE 4, the unit of the composition of each of the treatment agents is % by weight, and each numerical value in TABLE 4 indicates an active-ingredient amount (solid content amount).

<Preparation of Bright Pigment Ink>

Components, except for the bright pigment, which were included in a bright pigment ink composition (TABLE 5) were mixed uniformly or homogeneously, thereby obtaining an ink solvent. Subsequently, the ink solvent was added to the bright pigment, followed by being mixed uniformly. After that, the obtained mixture was filtrated through a cellulose acetate membrane filter (pore size 3.00 μm) produced by Toyo Roshi Kaisha, Ltd., and thereby obtaining each of the bright pigment inks 2-1 to 2-5. In TABLE 5, the unit of the composition of each of the bright pigment inks is % by weight, and each numerical value in TABLE 5 indicates an active-ingredient amount (solid content amount). Further, the composition of each of the bright pigment inks 2-1 to 2-5 indicated in TABLE 5 is the same as the composition of one of the bright pigment inks 1-2 to 1-6 indicated in TABLE 2.

Table 4 (Following)—Legend

*16: Self-dispersible yellow pigment: produced by Cabot Corporation

*17: Self-dispersible yellow pigment: produced by Cabot Corporation

*18: Self-dispersible magenta pigment: produced by Cabot Corporation

*19: Self-dispersible magenta pigment: produced by Cabot Corporation

*20: Self-dispersible cyan pigment: produced by Cabot Corporation

*21: Self-dispersible cyan pigment: produced by Cabot Corporation

*22: Self-dispersible black pigment: produced by Cabot Corporation

*1: Produced by Cabot Corporation; the average particle size, which was measured by using the dynamic light scattering particle size analyzer "LB-550" manufactured by HORIBA, Ltd., was 150 nm

*2: Produced by Cabot Corporation; the average particle size, which was measured by using the dynamic light scattering particle size analyzer "LB-550" manufactured by HORIBA, Ltd., was 230 nm

*3: Produced by NISSAN CHEMICAL INDUSTRIES, LTD.; average particle size: 10 to 20 nm

*4: Produced by NISSAN CHEMICAL INDUSTRIES, LTD.; average particle size: 200 nm

*5: Produced by FUSO CHEMICAL, CO., LTD.; average particle size: 125 nm

*6: Produced by Sanyo Chemical Industries, Ltd.; average particle size: 20 nm

*7: Produced by Sanyo Chemical Industries, Ltd.; average particle size: 70 nm

*8: Produced by Sanyo Chemical Industries, Ltd.; average particle size: 300 nm

*9: Acylic resin; produced by SEIKO PMC CORPORATION; average particle size: 40 nm

*10: Acrylic resin; produced by SEIKO PMC CORPORATION; average particle size: 80 nm

*11: Styrene-acryl resin; produced by SEIKO PMC CORPORATION; average particle size: 250 nm

*12: Acetylene glycol surfactant (ethylene oxide (10 mol) adduct of diol); produced by Nissin Chemical Co., Ltd; active-ingredient: 100%

*13: Sodium polyoxyethylene alkyl (C=12, 13) ether sulfate (3E.O); produced by Lion Corporation; active-ingredient: 28% by weight

*15: Produced by Arch Chemicals

TABLE 4

| | | Treatment agents (% by weight) | | | | | | |
|---|---|---|---|---|---|---|---|---|
| | | YP1 | YP2 | YP3 | YP4 | YP5 | YP6 | YP7 |
| Colorant | CAB-O-JET (trade name) 270Y (*16) | 5 | 4 | 5 | 4 | — | 5 | 4 |
| | CAB-O-JET (trade name) 470Y (*17) | — | — | — | — | 4 | — | — |
| | CAB-O-JET (trade name) 260M (*18) | — | — | — | — | — | — | — |
| | CAB-O-JET (trade name) 465M (*19) | — | — | — | — | — | — | — |
| | CAB-O-JET (trade name)250C (*20) | — | — | — | — | — | — | — |
| | CAB-O-JET (trade name)450C (*21) | — | — | — | — | — | — | — |
| | CAB-O-JET (trade name)400 (*22) | — | — | — | — | — | — | — |
| | C.I. Direct Yellow 86 | — | — | — | — | — | — | — |
| | C.I. Direct Red 1 | — | — | — | — | — | — | — |
| | C.I. Direct Blue 86 | — | — | — | — | — | — | — |

TABLE 4-continued

| | | | | | | | | |
|---|---|---|---|---|---|---|---|---|
| Fumed Silica (X) | CAB-O-SPERSE (trade name) PG002 (*1) | 15 | 8 | 24 | 20 | 15 | 6 | 26 |
| | CAB-O-SPERSE (trade name) PG001 (*2) | — | — | — | — | — | — | — |
| Colloidal Silica (X) | SNOWTEX(trade name) 20 (*3) | — | — | — | — | — | — | — |
| | SNOWTEX(trade name) MP-2400 (*4) | — | — | — | — | — | — | — |
| | PL-7 (*5) | — | — | — | — | — | — | — |
| Urethane resin (Y) | UCOAT (trade name) UWS-145 (*6) | 5 | 2 | 6 | — | 5 | 2 | 6 |
| | PERMARIN (trade name) UA-150 (*7) | — | — | — | 8 | — | — | — |
| | PERMARIN (trade name) UA-368 (*8) | — | — | — | — | — | — | — |
| Other resin (Y) | F-52 (*9) | — | — | — | — | — | — | — |
| | KE-1148 (*10) | — | — | — | — | — | — | — |
| | PE-1304 (*11) | — | — | — | — | — | — | — |
| Humectant | Glycerol | 5 | 4 | 6 | 5 | 5 | 5 | 5 |
| | Triethylene glycol | — | 2 | — | — | — | — | — |
| Penetrant | Triethylene glycol n-butyl ether | 2 | 3 | 3 | 2 | 2 | 2 | 3 |
| Surfactant | OLFINE(trade name) E1010 (*12) | 0.5 | 0.5 | — | 0.5 | 0.5 | 0.5 | 0.5 |
| | SUNNOL(trade name) NL-1430 (*13) | 1 | — | 1 | 1 | 1 | 1 | — |
| Fungicide | Proxel GXL(S) (*15) | 0.1 | 0.1 | 0.1 | 0.1 | 0.1 | 0.1 | 0.1 |
| Water | | balance | balance | balance | balance | balance | balance | balance |
| X/Y | | 3.0 | 4.0 | 4.0 | 2.5 | 3.0 | 3 | 4.3 |
| X + Y (% by weight) | | 20 | 10 | 30 | 28 | 20 | 8 | 32 |

| | | Treatment agents (% by weight) | | | | | | |
|---|---|---|---|---|---|---|---|---|
| | | YP8 | YP9 | YP10 | YP11 | YP12 | YP13 | YP14 |
| Colorant | CAB-O-JET (trade name) 270Y (*16) | 5 | 5 | 5 | 4 | 5 | 5 | 5 |
| | CAB-O-JET (trade name) 470Y (*17) | — | — | — | — | — | — | — |
| | CAB-O-JET (trade name) 260M (*18) | — | — | — | — | — | — | — |
| | CAB-O-JET (trade name) 465M (*19) | — | — | — | — | — | — | — |
| | CAB-O-JET (trade name)250C (*20) | — | — | — | — | — | — | — |
| | CAB-O-JET (trade name)450C (*21) | — | — | — | — | — | — | — |
| | CAB-O-JET (trade name)400 (*22) | — | — | — | — | — | — | — |
| | C.I. Direct Yellow 86 | — | — | — | — | — | — | — |
| | C.I. Direct Red 1 | — | — | — | — | — | — | — |
| | C.I. Direct Blue 86 | — | — | — | — | — | — | — |
| Fumed Silica (X) | CAB-O-SPERSE (trade name) PG002 (*1) | 20 | 4 | 30 | 26 | — | 26 | — |
| | CAB-O-SPERSE (trade name) PG001 (*2) | — | — | — | — | 20 | — | — |
| Colloidal Silica (X) | SNOWTEX(trade name) 20 (*3) | — | — | — | — | — | — | — |
| | SNOWTEX(trade name) MP-2400 (*4) | — | — | — | — | — | — | — |
| | PL-7 (*5) | — | — | — | — | — | — | — |
| Urethane resin (Y) | UCOAT (trade name) UWS-145 (*6) | 9 | 1 | 6 | 13 | 9 | — | — |
| | PERMARIN (trade name) UA-150 (*7) | — | — | — | — | — | — | — |
| | PERMARIN (trade name) UA-368 (*8) | — | — | — | — | — | 6 | — |
| Other resin (Y) | F-52 (*9) | — | — | — | — | — | — | — |
| | KE-1148 (*10) | — | — | — | — | — | — | — |
| | PE-1304 (*11) | — | — | — | — | — | — | — |
| Humectant | Glycerol | 5 | 4 | 5 | 6 | 5 | 5 | 5 |
| | Triethylene glycol | — | 2 | — | — | — | — | — |
| Penetrant | Triethylene glycol n-butyl ether | 3 | 3 | 2 | 3 | 2 | 3 | 2 |
| Surfactant | OLFINE(trade name) E1010 (*12) | 0.5 | 0.5 | 0.5 | — | 0.5 | 0.5 | 0.5 |
| | SUNNOL(trade name) NL-1430 (*13) | 1 | — | 1 | 1 | 1 | 1 | 1 |
| Fungicide | Proxel GXL(S) (*15) | 0.1 | 0.1 | 0.1 | 0.1 | 0.1 | 0.1 | 0.1 |
| Water | | balance | balance | balance | balance | balance | balance | balance |

TABLE 4-continued

| | | | | | | | |
|---|---|---|---|---|---|---|---|
| X/Y | 2.2 | 4.0 | 5.0 | 2.0 | 2.2 | 4.3 | — |
| X + Y (% by weight) | 29 | 5 | 36 | 39 | 29 | 32 | 0 |

| | | Treatment agents (% by weight) | | | | | |
|---|---|---|---|---|---|---|---|
| | | YP15 | YP16 | YP17 | YP18 | YP19 | YP20 | YP21 |

| | | YP15 | YP16 | YP17 | YP18 | YP19 | YP20 | YP21 |
|---|---|---|---|---|---|---|---|---|
| Colorant | CAB-O-JET (trade name) 270Y (*16) | 5 | 5 | 5 | 5 | 5 | 5 | 5 |
| | CAB-O-JET (trade name) 470Y (*17) | — | — | — | — | — | — | — |
| | CAB-O-JET (trade name) 260M (*18) | — | — | — | — | — | — | — |
| | CAB-O-JET (trade name) 465M (*19) | — | — | — | — | — | — | — |
| | CAB-O-JET (trade name)250C (*20) | — | — | — | — | — | — | — |
| | CAB-O-JET (trade name)450C (*21) | — | — | — | — | — | — | — |
| | CAB-O-JET (trade name)400 (*22) | — | — | — | — | — | — | — |
| | C.I. Direct Yellow 86 | — | — | — | — | — | — | — |
| | C.I. Direct Red 1 | — | — | — | — | — | — | — |
| | C.I. Direct Blue 86 | — | — | — | — | — | — | — |
| Fumed Silica (X) | CAB-O-SPERSE (trade name) PG002 (*1) | 15 | — | — | — | — | 15 | 8 |
| | CAB-O-SPERSE (trade name) PG001 (*2) | — | — | — | — | — | — | — |
| Colloidal Silica (X) | SNOWTEX(trade name) 20 (*3) | — | — | 15 | — | — | — | — |
| | SNOWTEX (trade name) MP-2400 (*4) | — | — | — | 8 | — | — | — |
| | PL-7 (*5) | — | — | — | — | 24 | — | — |
| Urethane resin (Y) | UCOAT (trade name) UWS-145 (*6) | — | 10 | 5 | 2 | 6 | — | — |
| | PERMARIN (trade name) UA-150 (*7) | — | — | — | — | — | — | — |
| | PERMARIN (trade name) UA-368 (*8) | — | — | — | — | — | — | — |
| Other resin (Y) | F-52 (*9) | — | — | — | — | — | 5 | — |
| | KE-1148 (*10) | — | — | — | — | — | — | 2 |
| | PE-1304 (*11) | — | — | — | — | — | — | — |
| Humectant | Glycerol | 5 | 4 | 5 | 4 | 5 | 4 | 4 |
| | Triethylene glycol | — | 2 | — | 2 | — | 2 | 2 |
| Penetrant | Triethylene glycol n-butyl ether | 2 | 3 | 2 | 3 | 2 | 3 | 3 |
| Surfactant | OLFINE(trade name) E1010 (*12) | 0.5 | 0.5 | 0.5 | 0.5 | 0.5 | 0.5 | 0.5 |
| | SUNNOL(trade name) NL-1430 (*13) | 1 | — | 1 | — | 1 | — | — |
| Fungicide | Proxel GXL(S) (*15) | 0.1 | 0.1 | 0.1 | 0.1 | 0.1 | 0.1 | 0.1 |
| Water | | balance | balance | balance | balance | balance | balance | balance |
| X/Y | | — | 0 | 3 | 4.0 | 4.0 | 3.0 | 4.0 |
| X + Y (% by weight) | | 15 | 10 | 20 | 10 | 30 | 20 | 10 |

| | | Treatment agents (% by weight) | | | | | |
|---|---|---|---|---|---|---|---|
| | | YP22 | MP1 | MP2 | MP3 | CP1 | CP2 | CP3 |

| | | YP22 | MP1 | MP2 | MP3 | CP1 | CP2 | CP3 |
|---|---|---|---|---|---|---|---|---|
| Colorant | CAB-O-JET (trade name) 270Y (*16) | 5 | — | — | — | — | — | — |
| | CAB-O-JET (trade name) 470Y (*17) | — | — | — | — | — | — | — |
| | CAB-O-JET (trade name) 260M (*18) | — | 5 | — | 5 | — | — | — |
| | CAB-O-JET (trade name) 465M (*19) | — | — | 6 | — | — | — | — |
| | CAB-O-JET (trade name)250C (*20) | — | — | — | — | 4 | — | 4 |
| | CAB-O-JET (trade name)450C (*21) | — | — | — | — | — | 5 | — |
| | CAB-O-JET (trade name)400 (*22) | — | — | — | — | — | — | — |
| | C.I. Direct Yellow 86 | — | — | — | — | — | — | — |
| | C.I. Direct Red 1 | — | — | — | — | — | — | — |
| | C.I. Direct Blue 86 | — | — | — | — | — | — | — |
| Fumed Silica (X) | CAB-O-SPERSE (trade name) PG002 (*1) | 24 | 8 | 24 | — | 20 | 15 | — |
| | CAB-O-SPERSE (trade name) PG001 (*2) | — | — | — | — | — | — | — |

TABLE 4-continued

|  |  |  |  |  |  |  |  |
|---|---|---|---|---|---|---|---|
| Colloidal Silica (X) | SNOWTEX(trade name) 20 (*3) | — | — | — | — | — | — |
|  | SNOWTEX(trade name) MP-2400 (*4) | — | — | — | — | — | — |
|  | PL-7 (*5) | — | — | — | — | — | — |
| Urethane resin (Y) | UCOAT (trade name) UWS-145 (*6) | — | — | 6 | — | 8 | 5 |
|  | PERMARIN (trade name) UA-150 (*7) | — | 2 | — | — | — | — |
|  | PERMARIN (trade name) UA-368 (*8) | — | — | — | — | — | — |
| Other resin (Y) | F-52 (*9) | — | — | — | — | — | — |
|  | KE-1148 (*10) | — | — | — | — | — | — |
|  | PE-1304 (*11) | 6 | — | — | — | — | — |
| Humectant | Glycerol | 5 | 4 | 6 | 4 | 5 | 5 | 5 |
|  | Triethylene glycol | — | 2 | — | 2 | — | — | — |
| Penetrant | Triethylene glycol n-butyl ether | 2 | 3 | 3 | 3 | 2 | 2 | 2 |
| Surfactant | OLFINE(trade name) E1010 (*12) | 0.5 | 0.5 | — | 0.5 | 0.5 | 0.5 | 0.5 |
|  | SUNNOL(trade name) NL-1430 (*13) | 1 | — | 1 | — | 1 | 1 | 1 |
| Fungicide | Proxel GXL(S) (*15) | 0.1 | 0.1 | 0.1 | 0.1 | 0.1 | 0.1 | 0.1 |
| Water |  | balance | balance | balance | balance | balance | balance | balance |
| X/Y |  | 4.0 | 4.0 | 4.0 | — | 2.5 | 3.0 | — |
| X + Y (% by weight) |  | 30 | 10 | 30 | 0 | 28 | 20 | 0 |

| | | Treatment agents (% by weight) | | | | | | |
|---|---|---|---|---|---|---|---|
| | | CP4 | KP1 | KP2 | KP3 | YD1 | YD2 | YD3 |
| Colorant | CAB-O-JET (trade name) 270Y (*16) | — | — | — | — | — | — | — |
|  | CAB-O-JET (trade name) 470Y (*17) | — | — | — | — | — | — | — |
|  | CAB-O-JET (trade name) 260M (*18) | — | — | — | — | — | — | — |
|  | CAB-O-JET (trade name) 465M (*19) | — | — | — | — | — | — | — |
|  | CAB-O-JET (trade name)250C (*20) | 4 | — | — | — | — | — | — |
|  | CAB-O-JET (trade name)450C (*21) | — | — | — | — | — | — | — |
|  | CAB-O-JET (trade name)400 (*22) | — | 7 | 7 | 7 | — | — | — |
|  | C.I. Direct Yellow 86 | — | — | — | — | 4 | 4 | 4 |
|  | C.I. Direct Red 1 | — | — | — | — | — | — | — |
|  | C.I. Direct Blue 86 | — | — | — | — | — | — | — |
| Fumed Silica (X) | CAB-O-SPERSE (trade name) PG002 (*1) | — | 8 | — | 8 | 24 | — | 15 |
|  | CAB-O-SPERSE (trade name) PG001 (*2) | — | — | — | — | — | — | — |
| Colloidal Silica (X) | SNOWTEX(trade name) 20 (*3) | — | — | — | — | — | — | — |
|  | SNOWTEX(trade name) MP-2400 (*4) | 8 | — | — | — | — | — | — |
|  | PL-7 (*5) | — | — | — | — | — | — | — |
| Urethane resin (Y) | UCOAT (trade name) UWS-145 (*6) | 2 | 2 | — | — | 6 | — | — |
|  | PERMARIN (trade name) UA-150 (*7) | — | — | — | — | — | — | — |
|  | PERMARIN (trade name) UA-368 (*8) | — | — | — | — | — | — | — |
| Other resin (Y) | F-52 (*9) | — | — | — | — | — | — | 5 |
|  | KE-1148 (*10) | — | — | — | 2 | — | — | — |
|  | PE-1304 (*11) | — | — | — | — | — | — | — |
| Humectant | Glycerol | 5 | 4 | 4 | 4 | 6 | 5 | 5 |
|  | Triethylene glycol | — | 2 | 2 | 2 | — | — | — |
| Penetrant | Triethylene glycol n-butyl ether | 2 | 3 | 3 | 3 | 3 | 2 | 2 |
| Surfactant | OLFINE(trade name) E1010 (*12) | 0.5 | 0.5 | 0.5 | 0.5 | — | 0.5 | 0.5 |
|  | SUNNOL(trade name) NL-1430 (*13) | 1 | — | — | — | 1 | 1 | 1 |
| Fungicide | Proxel GXL(S) (*15) | 0.1 | 0.1 | 0.1 | 0.1 | 0.1 | 0.1 | 0.1 |
| Water |  | balance | balance | balance | balance | balance | balance | balance |
| X/Y |  | 4.0 | 4.0 | — | 4.0 | 4.0 | — | 3.0 |
| X + Y (% by weight) |  | 10 | 10 | 0 | 10 | 30 | 0 | 20 |

TABLE 4-continued

|  |  | Treatment agents (% by weight) | | | | |
|---|---|---|---|---|---|---|
|  |  | MD1 | MD2 | MD3 | CD1 | CD2 |
| Colorant | CAB-O-JET (trade name) 270Y (*16) | — | — | — | — | — |
|  | CAB-O-JET (trade name) 470Y (*17) | — | — | — | — | — |
|  | CAB-O-JET (trade name) 260M (*18) | — | — | — | — | — |
|  | CAB-O-JET (trade name) 465M (*19) | — | — | — | — | — |
|  | CAB-O-JET (trade name)250C (*20) | — | — | — | — | — |
|  | CAB-O-JET (trade name)450C (*21) | — | — | — | — | — |
|  | CAB-O-JET (trade name)400 (*22) | — | — | — | — | — |
|  | C.I. Direct Yellow 86 | — | — | — | — | — |
|  | C.I. Direct Red 1 | 4 | 4 | 4 | — | — |
|  | C.I. Direct Blue 86 | — | — | — | 5 | 5 |
| Fumed Silica (X) | CAB-O-SPERSE (trade name) PG002 (*1) | 20 | — | — | 15 | — |
|  | CAB-O-SPERSE (trade name) PG001 (*2) | — | — | — | — | — |
| Colloidal Silica (X) | SNOWTEX(trade name) 20 (*3) | — | — | 15 | — | — |
|  | SNOWTEX(trade name) MP-2400 (*4) | — | — | — | — | — |
|  | PL-7 (*5) | — | — | — | — | — |
| Urethane resin (Y) | UCOAT (trade name) UWS-145 (*6) | 8 | — | 5 | — | — |
|  | PERMARIN (trade name) UA-150 (*7) | — | — | — | 5 | — |
|  | PERMARIN (trade name) UA-368 (*8) | — | — | — | — | — |
| Other resin (Y) | F-52 (*9) | — | — | — | — | — |
|  | KE-1148 (*10) | — | — | — | — | — |
|  | PE-1304 (*11) | — | — | — | — | — |
| Humectant | Glycerol | 5 | 5 | 5 | 5 | 4 |
|  | Triethylene glycol | — | — | — | — | 2 |
| Penetrant | Triethylene glycol n-butyl ether | 2 | 2 | 2 | 2 | 3 |
| Surfactant | OLFINE(trade name) E1010 (*12) | 0.5 | 0.5 | 0.5 | 0.5 | 0.5 |
|  | SUNNOL(trade name) NL-1430 (*13) | 1 | 1 | 1 | 1 | — |
| Fungicide | Proxel GXL(S) (*15) | 0.1 | 0.1 | 0.1 | 0.1 | 0.1 |
| Water |  | balance | balance | balance | balance | balance |
| X/Y |  | 2.5 | — | 3.0 | 3.0 | — |
| X + Y (% by weight) |  | 28 | 0 | 20 | 20 | 0 |

Table 5 (Following)—Legend

*14: Produced by Mitsubishi Materials Electronic Chemicals Co., Ltd.; average particle size: 20 nm

*12: Acetylene glycol surfactant (ethylene oxide (10 mol) adduct of diol); produced by Nissin Chemical Co., Ltd; active-ingredient: 100%

*13: Sodium polyoxyethylene alkyl (C=12, 13) ether sulfate (3E.O); produced by Lion Corporation; active-ingredient: 28% by weight

*15: Produced by Arch Chemicals

TABLE 5

|  |  | Bright pigment inks (% by weight) | | | | |
|---|---|---|---|---|---|---|
|  |  | 2-1 | 2-2 | 2-3 | 2-4 | 2-5 |
| Bright pigment | Silver Nanocolloid H-1 (*14) | 1 | 2 | 4 | 10 | 12 |
| Humectant | Glycerol | 30 | 15 | 30 | 28 | 30 |
|  | Triethylene glycol | — | 15 | — | — | — |
| Penetrant | Triethylene glycol n-butyl ether | — | — | — | 2 | — |
| Surfactant | OLFINE(trade name) E1010 (*12) | — | 0.5 | 1 | 1 | 2 |
|  | SUNNOL(trade name) NL-1430 (*13) | 1 | — | — | — | — |

TABLE 5-continued

|  |  | Bright pigment inks (% by weight) | | | | |
|---|---|---|---|---|---|---|
|  |  | 2-1 | 2-2 | 2-3 | 2-4 | 2-5 |
| Fungicide | Proxel GXL(S) (*15) | 0.1 | 0.1 | 0.1 | 0.1 | 0.1 |
| Water |  | balance | balance | balance | balance | balance |

As depicted in TABLE 6, the treatment agent was combined with the bright pigment ink, thereby obtaining each of the ink sets of Examples 2-1 to 2-25 and Comparative Examples 2-1 to 2-19.

There were performed (a) evaluation of brightness of the recorded portion, (b) evaluation of image quality (unevenness and blur) of the recorded portion, (c) evaluation of fixation of the recorded portion, and (d) overall evaluation on the ink sets of Examples 2-1 to 2-25 and Comparative Examples 2-1 to 2-19 in similar manners to Examples 1-1 to 1-21 and Comparative Examples 1-1 to 1-8.

The evaluation results of Examples 2-1 to 2-25 and Comparative Examples 2-1 to 2-19 are indicated in TABLE 6.

As indicated in TABLE 6, Examples 2-1 to 2-25 had good evaluation results of all of the brightness of the recorded portion, the image quality (unevenness and blur) of the recorded portion, and the fixation of the recorded portion. Especially, Examples 2-2 to 2-4 and 2-6 to 2-17 had extremely good evaluation results of all of the brightness of the recorded portion, the image quality (unevenness and blur) of the recorded portion, and the fixation of the recorded portion, each of Examples 2-2 to 2-4 and 2-6 to 2-17 being obtained to meet the following conditions: the treatment agent contained the fumed silica and at least one of the treatment agent and the bright pigment ink contained the urethane resin to satisfy the conditions (A1) and (B1); the fumed silica had an average particle size of 150 nm or less;

TABLE 6

|  | Examples | | | | | | | | | | | | | |
|---|---|---|---|---|---|---|---|---|---|---|---|---|---|---|
|  | 2-1 | 2-2 | 2-3 | 2-4 | 2-5 | 2-6 | 2-7 | 2-8 | 2-9 | 2-10 | 2-11 | 2-12 | 2-13 | 2-14 |
| Treatment agent |  | YP1 |  |  |  | YP2 | YP3 | YP4 | YP5 | MP1 | MP2 | CP1 | CP2 | KP1 |
| Bright pigment ink | 2-1 | 2-2 | 2-3 | 2-4 | 2-5 | 2-3 | 2-2 | 2-4 | 2-3 | 2-3 | 2-3 | 2-3 | 2-3 | 2-3 |
| Brightness of recorded portion | A | AA | AA | AA | AA | AA | AA | AA | AA | AA | AA | AA | AA | AA |
| Image quality of recorded portion (Unevenness and Blur) | AA | AA | AA | AA | AA | AA | AA | AA | AA | AA | AA | AA | AA | AA |
| Fixation of recorded portion | AA | AA | AA | AA | A | AA | AA | AA | AA | AA | AA | AA | AA | AA |
| Overall evaluation | G | G | G | G | G | G | G | G | G | G | G | G | G | G |

|  | Examples | | | | | | | | | | |
|---|---|---|---|---|---|---|---|---|---|---|---|
|  | 2-15 | 2-16 | 2-17 | 2-18 | 2-19 | 2-20 | 2-21 | 2-22 | 2-23 | 2-24 | 2-25 |
| Treatment agent | YD1 | MD1 | CD1 | YP6 | YP7 | YP8 | YP9 | YP10 | YP11 | YP12 | YP13 |
| Bright pigment ink | 2-3 | 2-3 | 2-3 | 2-3 | 2-2 | 2-3 | 2-3 | 2-3 | 2-2 | 2-3 | 2-3 |
| Brightness of recorded portion | AA | AA | AA | A | AA | AA | A | AA | AA | A | A |
| Image quality of recorded portion (Unevenness and Blur) | AA | AA | AA | AA | A | A | AA | A | A | A | A |
| Fixation of recorded portion | AA | AA | AA | AA | A | AA | AA | A | AA | AA | A |
| Overall evaluation | G | G | G | G | G | G | G | G | G | G | G |

|  | Comparative Examples | | | | | | | | | |
|---|---|---|---|---|---|---|---|---|---|---|
|  | 2-1 | 2-2 | 2-3 | 2-4 | 2-5 | 2-6 | 2-7 | 2-8 | 2-9 | 2-10 |
| Treatment agent | YP14 | MP3 | CP3 | KP2 | YD2 | MD2 | CD2 | YP15 | YP16 | YP17 |
| Bright pigment ink | 2-3 | 2-3 | 2-3 | 2-3 | 2-3 | 2-3 | 2-3 | 2-3 | 2-3 | 2-3 |
| Brightness of recorded portion | C | C | C | C | C | C | C | A | A | C |
| Image quality of recorded portion (Unevenness and Blur) | C | C | C | C | C | C | C | AA | C | AA |
| Fixation of recorded portion | C | C | C | C | C | C | C | C | A | AA |
| Overall evaluation | NG | NG | NG | NG | NG | NG | NG | NG | NG | NG |

|  | Comparative Examples | | | | | | | | |
|---|---|---|---|---|---|---|---|---|---|
|  | 2-11 | 2-12 | 2-13 | 2-14 | 2-15 | 2-16 | 2-17 | 2-18 | 2-19 |
| Treatment agent | YP18 | YP19 | YP20 | YP21 | YP22 | CP4 | KP3 | YD3 | MD3 |
| Bright pigment ink | 2-3 | 2-3 | 2-3 | 2-3 | 2-3 | 2-3 | 2-3 | 2-3 | 2-3 |
| Brightness of recorded portion | C | C | C | C | C | C | C | C | C |
| Image quality of recorded portion (Unevenness and Blur) | AA | AA | C | C | C | AA | C | C | AA |
| Fixation of recorded portion | AA | AA | AA | AA | AA | AA | AA | AA | AA |
| Overall evaluation | NG | NG | NG | NG | NG | NG | NG | NG | NG | the urethane resin particles, contained in the urethane emulsion, having an average particle size of 150 nm or less were used as the urethane resin; and the bright pigment ratio was in a range of 2% by weight to 10% by weight.

Meanwhile, each of Comparative Examples 2-1 to 2-7, in which the treatment agent contained no fumed silica and neither the treatment agent nor the bright pigment ink contained the urethane resin, had bad evaluation results of all of the brightness of the recorded portion, the image quality (unevenness and blur) of the recorded portion, and the fixation of the recorded portion. Comparative Example 2-8 in which neither the treatment agent nor the bright pigment ink contained the urethane resin had a bad evaluation result of the fixation of the recorded portion. Comparative Example 2-9 in which the treatment agent contained no fumed silica had a bad evaluation result of the image quality (unevenness and blur) of the recorded portion. Each of Comparative Examples 2-10 to 2-12, 2-16, and 2-19 in which the treatment agent contained colloidal silica instead of the fumed silica had a bad evaluation result of the brightness of the recorded portion. Each of Comparative Examples 2-13 to 2-15, 2-17, and 2-18 in which the treatment agent contained resin other than the urethane resin had bad evaluation results of the brightness of the recorded portion and the image quality (unevenness and blur) of the recorded portion.

As described above, using the ink set of the present teaching can obtain a recorded matter in which a blur and unevenness are inhibited and brightness is good, even when a recording medium with poor surface smoothness is used. The way of use of the ink set of the present teaching is not particularly limited, and the ink set is widely applicable to various types of ink-jet recording.

Examples 3-1 to 3-21 and Comparative Examples 3-1 to 3-3

<Preparation of Treatment Agent>

Respective components indicated in a treatment agent composition (TABLE 7) were mixed uniformly or homogeneously, thereby obtaining each of the treatment agents 3-1 to 3-8. In TABLE 7, the unit of the composition of each of the treatment agents is % by weight, and each numerical value in TABLE 7 indicates an active-ingredient amount (solid content amount).

<Preparation of Bright Pigment Ink>

Components, except for the bright pigment, which were included in a bright pigment ink composition (TABLE 8) were mixed uniformly or homogeneously, thereby obtaining an ink solvent. Subsequently, the ink solvent was added to the bright pigment, followed by being mixed uniformly. After that, the obtained mixture was filtrated through a cellulose acetate membrane filter (pore size 3.00 μm) produced by Toyo Roshi Kaisha, Ltd., and thereby obtaining each of the bright pigment inks 3-1 to 3-21. In TABLE 8, the unit of the composition of each of the bright pigment inks is % by weight, and each numerical value in TABLE 8 indicates an active-ingredient amount (solid content amount).

Table 7 (Following)—Legend

*1: Produced by Cabot Corporation; anionic; the average particle size, which was measured by using the dynamic light scattering particle size analyzer "LB-550" manufactured by HORIBA, Ltd., was 150 nm

*2: Produced by Cabot Corporation; anionic; the average particle size, which was measured by using the dynamic light scattering particle size analyzer "LB-550" manufactured by HORIBA, Ltd., was 230 nm

*23: Produced by Cabot Corporation; cationic; the average particle size, which was measured by using the dynamic light scattering particle size analyzer "LB-550" manufactured by HORIBA, Ltd., was 150 nm

*3: Produced by NISSAN CHEMICAL INDUSTRIES, LTD.; average particle size: 10 to 20 nm

*4: Produced by NISSAN CHEMICAL INDUSTRIES, LTD.; average particle size: 200 nm

*6: Produced by Sanyo Chemical Industries, Ltd.; average particle size: 20 nm

*12: Acetylene glycol surfactant (ethylene oxide (10 mol) adduct of diol); produced by Nissin Chemical Co., Ltd; active-ingredient: 100%

*13: Sodium polyoxyethylene alkyl (C=12, 13) ether sulfate (3E.O); produced by Lion Corporation; active-ingredient: 28% by weight

TABLE 7

| | | Treatment agents (% by weight) | | | | | | | |
|---|---|---|---|---|---|---|---|---|---|
| | | 3-1 | 3-2 | 3-3 | 3-4 | 3-5 | 3-6 | 3-7 | 3-8 |
| Fumed Silica | CAB-O-SPERSE(trade name) PG002 (*1) | 15 | 8 | 24 | — | — | — | — | 15 |
| | CAB-O-SPERSE(trade name) PG001 (*2) | — | — | — | 15 | — | — | — | — |
| | CAB-O-SPERSE(trade name) PG022 (*23) | — | — | — | — | 15 | — | — | — |
| Colloidal Silica | SNOWTEX (trade name) 20 (*3) | — | — | — | — | — | 15 | — | — |
| | SNOWTEX (trade name) MP-2400 (*4) | — | — | — | — | — | — | 15 | — |
| Urethane resin | UCOAT (trade name) UWS-145 (*6) | — | — | — | — | — | — | — | 0.6 |
| Humectant | Glycerol | 12 | 19 | 2 | 13 | 12 | 11.5 | 12 | 11.4 |
| | Triethylene glycol | — | — | — | — | — | — | — | — |
| Penetrant | Triethylene glycol n-butyl ether | 2 | 2 | 2 | 1 | 2 | 2 | 2 | 2 |
| Surfactant | OLFINE(trade name) E1010 (*12) | — | 1 | 1 | 0.5 | — | 0.5 | 1 | — |
| | SUNNOL(trade name) NL-1430 (*13) | 1 | — | 1 | 0.5 | 1 | 1 | — | 1 |
| Water | | balance | balance | balance | balance | balance | balance | balance | balance |

*14: produced by Mitsubishi Materials Electronic Chemicals Co., Ltd.; the average particle size: 20 nm
*6: Produced by Sanyo Chemical Industries, Ltd.; average particle size: 20 nm
*7: Produced by Sanyo Chemical Industries, Ltd.; average particle size: 70 nm
*8: Produced by Sanyo Chemical Industries, Ltd.; average particle size: 300 nm
*12: Acetylene glycol surfactant (ethylene oxide (10 mol) adduct of diol); produced by Nissin Chemical Co., Ltd; active-ingredient: 100%
*13: Sodium polyoxyethylene alkyl (C=12, 13) ether sulfate (3E.O); produced by Lion Corporation; active-ingredient: 28% by weight
*15: Produced by Arch Chemicals There were performed (a) evaluation of image quality (the brightness, unevenness, and blur) of the recorded portion, (b) evaluation of fixation of the recorded portion, and (c) overall evaluation on the ink sets of Examples 3-1 to 3-21 and Comparative Examples 3-1 to 3-3 by the following methods. The samples used for the evaluations (a) and (b) were prepared in similar manners to those of Examples 1-1 to 1-21 and Comparative Examples 1-1 to 1-8.

(a) Evaluation of Image Quality (the Brightness, Unevenness, and Blur) of the Recorded Portion The solid portion of each of the evaluation samples was observed visually, and the brightness, unevenness, and blur of the image were evaluated in accordance with the following evaluation criterion.

TABLE 8

| | | Bright pigment inks (% by weight) | | | | | | | | | |
|---|---|---|---|---|---|---|---|---|---|---|---|
| | | 3-1 | 3-2 | 3-3 | 3-4 | 3-5 | 3-6 | 3-7 | 3-8 | 3-9 | 3-10 |
| Bright pigment (L) | Silver Nanocolloid H-1 (*14) | 3 | 3 | 3 | 3 | 3 | 3 | 3 | 1 | 2 | 2 |
| Urethane resin (M) | UCOAT (trade name) UWS-145 (*6) | 0.1 | 0.2 | 0.3 | 0.6 | 1 | 1.2 | 1.5 | 0.2 | 0.2 | 0.6 |
| | PERMARIN (trade name) UA-150 (*7) | — | — | — | — | — | — | — | — | — | — |
| | PERMARIN (trade name) UA-368 (*8) | — | — | — | — | — | — | — | — | — | — |
| Humectant | Glycerol | 28.9 | 26.8 | 28.7 | 26.4 | 13 | 27.3 | 27.5 | 26.8 | 28.8 | 26.9 |
| | Triethylene glycol | — | — | — | — | 15 | — | — | — | — | — |
| Penetrant | Triethylene glycol n-butyl ether | — | 2 | — | 2 | — | — | — | 2 | — | 2 |
| Surfactant | OLFINE(trade name) E1010 (*12) | 1 | 1 | 1 | 1 | 1 | 1 | 1 | 1 | 1 | — |
| | SUNNOL(trade name) NL-1430 (*13) | — | — | — | — | — | 0.5 | — | — | — | 0.5 |
| Fungicide | Proxel GXL(S) (*15) | 0.1 | 0.1 | 0.1 | 0.1 | 0.1 | 0.1 | 0.1 | 0.1 | 0.1 | 0.1 |
| Water | | balance | balance | balance | balance | balance | balance | balance | balance | balance | balance |
| L/M | | 30.0 | 15.0 | 10.0 | 5.0 | 3.0 | 2.5 | 2.0 | 5.0 | 10.0 | 3.3 |
| L + M (% by weight) | | 3.1 | 3.2 | 3.3 | 3.6 | 4 | 4.2 | 4.5 | 1.2 | 2.2 | 2.6 |

| | | Bright pigment inks (% by weight) | | | | | | | | | |
|---|---|---|---|---|---|---|---|---|---|---|---|
| | | 3-11 | 3-12 | 3-13 | 3-14 | 3-15 | 3-16 | 3-17 | 3-18 | 3-19 | 3-20 | 3-21 |
| Bright pigment (L) | Silver Nanocolloid H-1 (*14) | 5 | 5 | 8 | 10 | 8 | 8 | 3 | 3 | 3 | 0.5 | 12 |
| Urethane resin (M) | UCOAT (trade name) UWS-145 (*6) | 0.5 | 1.5 | 1 | 2 | — | — | — | 0.05 | 2 | 0.1 | 2.4 |
| | PERMARIN (trade name) UA-150 (*7) | — | — | — | — | 1.5 | — | — | — | — | — | — |
| | PERMARIN (trade name) UA-368 (*8) | — | — | — | — | — | 1.5 | — | — | — | — | — |
| Humectant | Glycerol | 26.5 | 27.5 | 28 | 27 | 27.5 | 27.5 | 29 | 28.95 | 27 | 28.9 | 26.6 |
| | Triethylene glycol | — | — | — | — | — | — | — | — | — | — | — |
| Penetrant | Triethylene glycol n-butyl ether | 2 | — | — | — | — | — | — | — | — | — | — |
| Surfactant | OLFINE(trade name) E1010 (*12) | 1 | 1 | 1 | 1 | 1 | 1 | 1 | 1 | 1 | 1 | 1 |
| | SUNNOL(trade name) NL-1430 (*13) | — | — | — | — | — | — | — | — | — | — | — |
| Fungicide | Proxel GXL(S) (*15) | 0.1 | 0.1 | 0.1 | 0.1 | 0.1 | 0.1 | 0.1 | 0.1 | 0.1 | 0.1 | 0.1 |
| Water | | balance | balance | balance | balance | balance | balance | balance | balance | balance | balance | balance |
| L/M | | 10.0 | 3.3 | 8.0 | 5.0 | 5.3 | 5.3 | 0 | 60.0 | 1.5 | 5.0 | 5.0 |
| L + M (% by weight) | | 5.5 | 6.5 | 9 | 12 | 9.5 | 9.5 | 3 | 3.1 | 5 | 0.6 | 14.4 |

As depicted in TABLE 9, the treatment agent was combined with the bright pigment ink, thereby obtaining each of the ink sets of Examples 3-1 to 3-21 and Comparative Examples 3-1 to 3-3.

<Evaluation of Image Quality (the Brightness, Unevenness, and Blur) of the Recorded Portion and Evaluation Criterion>

A: The brightness was sufficient, and the unevenness and blur were inhibited sufficiently.

B: The brightness was slightly poor, or the unevenness or blur was observed to some extent, but no problem for practical use.

C: There was no brightness or at least one of the unevenness and blur was not inhibited, which would cause a problem for practical use.

(c) Evaluation of Fixation of the Recorded Portion

The solid portion of each of the evaluation samples was rubbed with a finger 30 seconds after the recording. The rubbing-off of the bright pigment ink was visually observed, and the fixation of the recorded portion was evaluated in accordance with the following criterion.

<Evaluation of Fixation of the Recorded Portion and Evaluation Criterion>

A: The recorded portion had no rubbing-off.

B: The recorded portion had rubbing-off slightly, but it was no problem for practical use.

C: The recorded portion had rubbing-off clearly, which would cause a problem for practical use.

(d) Overall Evaluation

The overall evaluation was performed based on the results (a) and (b) in accordance with the following criterion.

<Overall Evaluation and Evaluation Criterion>

G: Both of the results (a) and (b) were "A" or "B".

NG: There was "C" in any of the results (a) and (b).

The evaluation results of Examples 3-1 to 3-21 and Comparative Examples 3-1 to 3-3 are indicated in TABLE 9.

When Example 3-1 is compared to Example 3-20, Example 3-20 had better evaluation results of the image quality of the recorded portion and the fixation of the recorded portion than those of Example 3-1, Example 3-1 being obtained by use of the treatment agent 3-1 containing the anionic fumed silica, Example 3-20 being obtained by use of the treatment agent 3-5 containing the cationic fumed silica.

Meanwhile, Comparative Example 3-1 in which the bright pigment ink contained no urethane resin had a bad evaluation result of the fixation of the recorded portion. Each of Comparative Examples 3-2 and 3-3 in which the treatment agent contained colloidal silica instead of the fumed silica had a bad evaluation result of the image quality of the recorded portion.

Subsequently, there was performed (d) evaluation of quick drying property of the treatment agent on the ink sets of Examples 3-1 to 3-21 and Comparative Examples 3-1 to 3-3 by the following method.

(d) Evaluation of Quick Drying Property of Treatment Agent

The treatment agent constituting each of the ink sets of Examples 3-1 to 3-21 and Comparative Examples 3-1 to 3-3 was applied on a matte paper (BP60MA, produced by

TABLE 9

| | Examples | | | | | | | | | | | | | |
|---|---|---|---|---|---|---|---|---|---|---|---|---|---|---|
| | 3-1 | 3-2 | 3-3 | 3-4 | 3-5 | 3-6 | 3-7 | 3-8 | 3-9 | 3-10 | 3-11 | 3-12 | 3-13 | 3-14 |
| Treatment agent | | | | | | | | 3-1 | | | | | | |
| Bright pigment ink | 3-1 | 3-2 | 3-3 | 3-4 | 3-5 | 3-6 | 3-7 | 3-8 | 3-9 | 3-10 | 3-11 | 3-12 | 3-13 | 3-14 |
| Image quality of recorded portion | B | B | A | A | A | B | B | B | A | A | A | A | A | B |
| Fixation of recorded portion | B | B | A | A | A | A | A | A | A | A | A | A | A | B |
| Overall evaluation | G | G | G | G | G | G | G | G | G | G | G | G | G | G |

| | Examples | | | | | | | Comparative Examples | | |
|---|---|---|---|---|---|---|---|---|---|---|
| | 3-15 | 3-16 | 3-17 | 3-18 | 3-19 | 3-20 | 3-21 | 3-1 | 3-2 | 3-3 |
| Treatment agent | 3-1 | | 3-2 | 3-3 | 3-4 | 3-5 | 3-8 | 3-1 | 3-6 | 3-7 |
| Bright pigment ink | 3-15 | 3-16 | | | 3-1 | | | 3-17 | 3-1 | |
| Image quality of recorded portion | B | B | A | A | B | A | A | B | C | C |
| Fixation of recorded portion | A | B | A | A | A | A | A | C | A | A |
| Overall evaluation | G | G | G | G | G | G | G | NG | NG | NG |

As indicated in TABLE 9, Examples 3-1 to 3-21 had good evaluation results of both of the image quality of the recorded portion and the fixation of the recorded portion. Especially, Examples 3-3 to 3-5 and 3-9 to 3-13 had extremely good evaluation results of both of the image quality of the recorded portion and the fixation of the recorded portion, each of Examples 3-3 to 3-5 and 3-9 to 3-13 being obtained to meet the following conditions: the bright pigment ink contained the bright pigment and the urethane resin to satisfy the conditions (C2) and (D2); and the urethane resin particles, contained in the urethane emulsion, having an average particle size of 150 nm or less were used as the urethane resin.

BROTHER KOGYO KABUSHIKI KAISHA) with a bar coater (Bar Coater, Rod No. 3 produced by Yasuda Seiki Seisakusho, Ltd.). Immediately after this, the portion to which the treatment agent was applied was rubbed with a finger, and the quick drying property of the treatment agent was evaluated in accordance with the following criterion.

<Evaluation of Quick Drying Property of Treatment Agent and Evaluation Criterion>

A: No treatment agent stuck to the finger.

C: The treatment agent stuck to the finger.

The evaluation results of Examples 3-1 to 3-21 and Comparative Examples 3-1 to 3-3 are indicated in TABLE 10.

TABLE 10

| Examples | 3-1 | 3-2 | 3-3 | 3-4 | 3-5 | 3-6 | 3-7 | 3-8 | 3-9 | 3-10 | 3-11 | 3-12 | 3-13 | 3-14 | 3-15 | 3-16 | 3-17 |
|---|---|---|---|---|---|---|---|---|---|---|---|---|---|---|---|---|---|
| Quick drying property of treatment agent | A | A | A | A | A | A | A | A | A | A | A | A | A | A | A | A | A |

| Examples | 3-18 | 3-19 | 3-20 | 3-21 |
|---|---|---|---|---|
| Quick drying property of treatment agent | A | A | A | C |

| Comparative examples | 3-1 | 3-2 | 3-3 |
|---|---|---|---|
| Quick drying property of treatment agent | A | A | A |

As indicated in TABLE 10, each of Examples 3-1 to 3-20 in which the treatment agent contained no urethane resin had a good evaluation result of the quick drying property of the treatment agent. However, Example 3-21 in which the treatment agent contained the urethane resin had a bad evaluation result of quick drying property of the treatment agent. From this result, it has been found out that the ink set in which the bright pigment ink contained the urethane ink had a better evaluation result of the quick drying property of the treatment agent than the ink set in which the treatment agent contained the urethane resin. Each of Comparative Examples 3-1 to 3-3 had a good evaluation result of the quick drying property of the treatment agent.

As described above, using the ink set of the present teaching is capable of obtaining a recorded matter in which a blur and unevenness are inhibited and brightness is good even when a recording medium having poor surface smoothness is used, and further is capable of reducing the drying time of the treatment agent. The way of use of the ink set of the present teaching is not particularly limited, and the ink set is widely applicable to various types of ink-jet recording.

What is claimed is:

1. An ink set, comprising:
   a treatment agent composition containing fumed silica; and
   a bright pigment ink composition containing a bright pigment and water,
   wherein the treatment agent composition or the bright pigment ink composition contains urethane resin; and
   wherein a total blending amount of pigment in the treatment agent composition is 0% by weight to 0.1% by weight, and a blending amount of the bright pigment in the bright pigment ink composition is 1% by weight to 12% by weight.

2. An ink set, comprising:
   a treatment agent composition containing fumed silica; and
   a bright pigment ink composition containing a bright pigment and water,
   wherein the treatment agent composition contains urethane resin and bright pigment ink composition contains no urethane resin.

3. An ink set, comprising:
   a treatment agent composition containing fumed silica; and
   a bright pigment ink composition containing a bright pigment and water,
   wherein the bright pigment ink composition contains urethane resin and the treatment agent composition contains no urethane resin.

4. The ink set according to claim 1, wherein the treatment agent composition further contains a colorant.

5. The ink set according to claim 1, wherein the ink set satisfies the following conditions (A) and (B)

$$2 < X/Y < 5 \tag{A}$$

$$5 < X+Y < 40 \tag{B}$$

X: a blending amount (% by weight) of the fumed silica in the treatment agent composition Y: the sum of a blending amount (% by weight) of the urethane resin in the treatment agent composition and a blending amount (% by weight) of the urethane resin in the bright pigment ink composition.

6. The ink set according to claim 1, wherein the ink set satisfies the following conditions (A1) and (B1)

$$2.5 < X/Y < 4 \tag{A1}$$

$$10 < X+Y < 30 \tag{B1}$$

X: a blending amount (% by weight) of the fumed silica in the treatment agent composition Y: the sum of a blending amount (% by weight) of the urethane resin in the treatment agent composition and a blending amount (% by weight) of the urethane resin in the bright pigment ink composition.

7. The ink set according to claim 1, wherein the fumed silica has an average particle size of 250 nm or less.

8. The ink set according to claim 1, wherein the fumed silica has an average particle size of 150 nm or less.

9. The ink set according to claim 1, wherein the fumed silica is cationic fumed silica or anionic fumed silica.

10. The ink set according to claim 1, wherein the urethane resin is urethane resin particles contained in urethane emulsion.

11. The ink set according to claim 10, wherein the urethane resin particles contained in the urethane emulsion have an average particle size of 300 nm or less.

12. The ink set according to claim 10, wherein the urethane resin particles contained in the urethane emulsion have an average particle size of 150 nm or less.

13. The ink set according to claim 10, wherein the urethane resin particles contained in the urethane emulsion have an average particle size which is smaller than an average particle size of the fumed silica.

14. The ink set according to claim 1, wherein the bright pigment is silver particles or aluminum particles.

15. The ink set according to claim 2, wherein the bright pigment ink contains 1% by weight to 12% by weight of the bright pigment.

16. The ink set according to claim 1, wherein the bright pigment ink contains 2% by weight to 10% by weight of the bright pigment.

17. The ink set according to claim 1, wherein the bright pigment ink contains the urethane resin to satisfy the following conditions (C) and (D)

$$2 < L/M < 30 \quad \text{(C)}$$

$$1.2 < L+M < 12 \quad \text{(D)}$$

L: a blending amount (% by weight) of the bright pigment in the bright pigment ink composition M: a blending amount (% by weight) of the urethane resin in the bright pigment ink composition.

18. The ink set according to claim 1, wherein the bright pigment ink composition contains the urethane resin to satisfy the following conditions (C1) and (D1)

$$2 < L/M < 15 \quad \text{(C1)}$$

$$1.2 < L+M < 9.5 \quad \text{(D1)}$$

L: a blending amount (% by weight) of the bright pigment in the bright pigment ink composition M: a blending amount (% by weight) of the urethane resin in the bright pigment ink composition.

19. The ink set according to claim 1, wherein the bright pigment ink composition contains the urethane resin to satisfy the following conditions (C2) and (D2)

$$3 < L/M < 10 \quad \text{(C2)}$$

$$2.2 < L+M < 9 \quad \text{(D2)}$$

L: a blending amount (% by weight) of the bright pigment in the bright pigment ink composition M: a blending amount (% by weight) of the urethane resin in the bright pigment ink composition.

20. The ink set according to claim 1, further comprising a water-based ink composition containing a colorant and water.

* * * * *

UNITED STATES PATENT AND TRADEMARK OFFICE
CERTIFICATE OF CORRECTION

PATENT NO. : 9,862,848 B2
APPLICATION NO. : 14/673291
DATED : January 9, 2018
INVENTOR(S) : Imai et al.

Page 1 of 2

It is certified that error appears in the above-identified patent and that said Letters Patent is hereby corrected as shown below:

In the Claims

In Column 42, Claim 5, Lines 24-28:
Please delete "the ink set according to claim 1, wherein the ink set satisfies the following conditions (A) and (B)
$2 < X / Y < 5$ (A)
$5 < X + Y < 40$ (B)"
and insert --The ink set according to claim 1, wherein the ink set satisfies the following conditions (A) and (B)
$2 \leq X / Y \leq 5$ (A)
$5 \leq X + Y \leq 40$ (B)--

In Column 42, Claim 6, Lines 35-40:
Please delete "The ink set according to claim 1, wherein the ink set satisfies the following conditions (A1) and (B1)
$2.5 < X / Y < 4$ (A1)
$10 < X + Y < 30$ (B1)"
and insert --The ink set according to claim 1, wherein the ink set satisfies the following conditions (A1) and (B1)
$2.5 \leq X / Y \leq 4$ (A1)
$10 \leq X + Y \leq 30$ (B1)--

In Column 43, Claim 17, Lines 7-14:
Please delete "The ink set according to claim 1, wherein the bright pigment ink contains the urethane resin to satisfy the following conditions (C) and (D)
$2 < L / M < 30$ (C)
$1.2 \leq L + M \leq 12$ (D)"
and insert --The ink set according to claim 1, wherein the bright pigment ink contains the urethane resin to satisfy the following conditions (C) and (D)

Signed and Sealed this
Sixth Day of November, 2018

Andrei Iancu
*Director of the United States Patent and Trademark Office*

$2 \leq L/M \leq 30$         (C)
$1.2 \leq L + M \leq 12$         (D)--

In Column 43, Claim 18, Lines 19-21 and in Column 44, Claim 18, Lines 1-3:
Please delete "The ink set according to claim 1, wherein the bright pigment ink composition contains the urethane resin to satisfy the following conditions (C1) and (D1)
    $2 < L/M < 15$         (C1)
    $1.2 < L + M < 9.5$         (D1)"
and insert --The ink set according to claim 1, wherein the bright pigment ink composition contains the urethane resin to satisfy the following conditions (C1) and (D1)
    $2 \leq L/M \leq 15$         (C1)
    $1.2 \leq L + M \leq 9.5$         (D1)--

In Column 44, Claim 19, Lines 8-13:
Please delete "The ink set according to claim 1, wherein the bright pigment ink composition contains the urethane resin to satisfy the following conditions (C2) and (D2)
    $3 < L/M < 10$         (C2)
    $2.2 < L + M < 9$         (D2)"
and insert --The ink set according to claim 1, wherein the bright pigment ink composition contains the urethane resin to satisfy the following conditions (C2) and (D2)
    $3 \leq L/M \leq 10$         (C2)
    $2.2 \leq L + M \leq 9$         (D2)--